United States Patent [19]
Matsunoshita

[11] Patent Number: 5,835,691
[45] Date of Patent: Nov. 10, 1998

[54] IMAGE PROCESSING APPARATUS WITH DETECTION OF AN OVERFLOW AND UNDERFLOW IN A CODE BUFFER

[75] Inventor: Junichi Matsunoshita, Ebina, Japan

[73] Assignee: Fuji Xerox Co., LTD., Tokyo, Japan

[21] Appl. No.: 729,372

[22] Filed: Oct. 17, 1996

[30] Foreign Application Priority Data

Oct. 20, 1995 [JP] Japan .................................... 7-273121
Sep. 18, 1996 [JP] Japan .................................... 8-246658

[51] Int. Cl.⁶ .................................................. H04N 1/419
[52] U.S. Cl. ......................... 395/116; 358/404; 358/426
[58] Field of Search ................................ 395/115, 116; 358/404, 444, 468, 261.1, 261.4, 426; H04N 1/419

[56] References Cited

U.S. PATENT DOCUMENTS

| | | | |
|---|---|---|---|
| 5,223,948 | 6/1993 | Sakurai et al. | 358/404 |
| 5,253,077 | 10/1993 | Hasegawa et al. | 358/404 |
| 5,369,505 | 11/1994 | Wantanabe et al. | 358/404 |
| 5,534,929 | 7/1996 | Tanaka . | |
| 5,710,638 | 1/1998 | Yamamoto et al. | 358/404 |

FOREIGN PATENT DOCUMENTS

| | | |
|---|---|---|
| A-5-244367 | 9/1993 | Japan . |
| A-6-86030 | 3/1994 | Japan . |
| A-6-274605 | 9/1994 | Japan . |
| A-7-107300 | 4/1995 | Japan . |

*Primary Examiner*—Kim Yen Vu
*Attorney, Agent, or Firm*—Oliff & Berridge

[57] ABSTRACT

There are provided an image input section for inputting image data at a constant time interval on a page-by-page basis, an image compression/decompression section for compressing input image data into coded data, a hard disk for storing the coded data, a code buffer for buffering a transfer of the coded data, and an overflow/underflow detection section for detecting an overflow in the code buffer. If an overflow is detected, image processing control section instructs the code buffer to discard the coded data of the overflow-occurring page and continue transferring residual coded data of a preceding page, and causes the image input section to again input image data of the overflow-occurring page.

8 Claims, 15 Drawing Sheets

IMAGE PROCESSING APPARATUS WITH DETECTION OF AN OVERFLOW AND UNDERFLOW IN A CODE BUFFER

BACKGROUND OF THE INVENTION

1. Field of the Invention

This invention relates to an information processing apparatus and, in particular, to an information processing apparatus having an electronic sort function of reading an original document of a plurality of pages, compressing and storing the resulting image data, and then reading out the stored image data a specified number of times in a specified order while decompressing it each time.

2. Description of the Related Art

Conventionally, image processing apparatuses such as a digital copier are provided with an electronic sort function as one function. The sort function is provided by reading an original document of a plurality of pages through an image input unit such as a scanner once into a storage, reading out the image data of the original document as many times as specified in the specified order, and forming an image according to the read image data. For example, to make three copies of an original document consisting of pages A, B, and C, the original document is read one page at a time in the page order of A, B, and C and the image data thereof is stored, then is read in the order of pages A, B, C, A, B, C, A, B, C, and an image is formed each time, whereby three copies of the original document are provided in the same page order as the original document.

The image processing apparatus having the sort function compresses image data for storage when the image data is input, then decompresses read data into the former image data and performs image output such as image formation based on the image data for the following two reasons: First, it is necessary to store a large amount of image data on a storage of a limited capacity. Second, although the hard disk (drive) is appropriate as a storage device because of its high cost-vs.-capacity performance, the capacity of the image data to be transferred needs to be lessened because there is an upper limit on the transfer rates to and from the hard disk.

For example, a still image system recommended in JPEG (joint photographic experts group) using quadrature transformation and variable-length coding in combination is available as an algorithm used for such compression and decompression processing. Since the JPEG system is a variable-length compression system, the generated code amount varies depending on the characteristics of input image data. Since the JPEG system is irreversible, if the compression ratio is high, the generated code amount can be decreased, but image degradation is remarkable when the image data is decompressed; in contrast, if the compression ratio is low, image degradation can be suppressed when the image data is decompressed, but the generated code amount increases.

On the other hand, to input images at a given pitch (time interval) every page, when the generated code amount of one page is larger than the data amount that can be transferred to hard disk within the pitch, coded data of continuous pages cannot be stored on the hard disk and data is stored with some data missing out of synchronization with the image input unit.

Likewise, to output images at a given pitch every page, when the code amount of one page is larger than the data amount that can be transferred from hard disk within the pitch, coded data of continuous pages cannot be read from the hard disk and an irregular image is output out of synchronization with the image output unit.

The reason why images are input and output at a given pitch is to control the operation of a flat bed scanner or a page printer, which generally serves as the nucleus for such operations, independently of the data transfer state, to thereby simplify the configuration.

To solve such problems, an art is described in Japanese Unexamined Patent Publication No. Hei. 7-107300, for example. In the art disclosed here, the code amount generated every page is monitored and if it exceeds a preset threshold value, the compression condition is changed so as to furthermore raise the compression ratio and the same image is again read and compressed under the changed compression condition, whereby finally the image of every page can be compressed to the code amount less than the threshold value for transferring the coded data of every page to hard disk within one pitch.

Here, the techniques described in the above publication will be discussed in detail. FIG. 13 is a block diagram to show the configuration of an image processing apparatus having an electronic sort function using the art. In the figure, numeral 201 is a pre-image processing section for applying pre-processing of image processing to image data input from an image input unit (not shown in FIG. 13) and numeral 202 is a post-image processing section for applying post-processing of image processing when image data is output to an image output unit (not shown). Numeral 203 is an image compression/decompression section for compressing image data to coded data when the image data is input and decompressing the coded data into the former image data when the image data is output. Numeral 204 is a code buffer for buffering coded data. Numeral 205 is a main storage for storing compressed coded data; a hard disk is used for the reasons described above.

Numeral 206 is an image processing control section for controlling the entire image processing apparatus. Numeral 207 is a code amount detection section for detecting the code amount of image data compressed by the image compression/decompression section 203 for each page.

Next, the operation of the image processing apparatus will be discussed. First, the image input operation will be described.

At the beginning, the image input unit reads an original document one page at a time at a given pitch and image data is generated each time. That is, image data corresponding to one page of the original document is generated within one pitch. Paying now attention to the period of one pitch, 1-page image data is subjected to pre-processing by the pre-image processing section 201 and is compressed by the image compression/decompression section 203. Next, the compressed coded data is buffered in the code buffer 204 and the code amount of the data is detected by the code amount detection section 207. The image processing control section 206 continues to compare the code amount detected by the code amount detection section 207 with a target code amount of a preset threshold value until compression of the 1-page image data is complete. The target code amount is determined based on the capacity of data that can be transferred to the hard disk within one pitch.

At the completion of the compression of the 1-page image data, if the detected code amount does not exceed the target code amount, the image processing control section 206 assumes that the processing normally terminates, and reads the coded data written into the code buffer 204 and transfers the coded data to the hard disk 205 for storage. Concurrently, it instructs the image input unit to read the next page of the original document.

On the other hand, if the detected code amount exceeds the target code amount by the time the compression of the 1-page image data is complete, the image processing control section 206 assumes that the processing abnormally terminates, and performs the following error handling:

First, the image processing control section 206 stops write into the code buffer 204 when the detected code amount exceeds the target code amount, and restores the write address into the code buffer 204 to the top address of the page, whereby the coded data of the page buffered in the code buffer 204 is discarded.

However, the image processing control section 206 causes the image input unit and the image compression/decompression section 203 to continue to read the page and compress the page image data in order to find a difference between the generated code amount of the page and the target code amount at the termination of the compression of the page image data for the following reason: (If the image input unit and the image compression/decompression section 203 stop the operation, the difference cannot be found.)

At the termination of the compression of the page image data, the image processing control section 206 finds a compression ratio at which the generated code amount of the page falls below the target code amount from the difference between the generated code amount of the page and the target code amount, and sets the found compression ratio in the image compression/decompression section 203. Then, the image processing control section 206 instructs the image input unit to again read the same page of the original document at the next pitch.

By performing the error handling, the same page of the original document is again read at the next pitch, in which case the newly changed compression ratio is set in the image compression/decompression section 203. Then, the generated code amount as the page is again read falls below the target code amount and the process normally terminates.

The processing is performed for every page of the document at each pitch.

Thus, the code amount generated within one pitch always falls below the target code amount, circumventing the missing data problem in data transfer to the hard disk 205.

FIG. 14 shows the specific image input operation in the image processing apparatus. As shown here, the code amounts of original documents 2, 4, and 5 exceed the target code amount, thus the original documents are again read (rescanned). Since data transfer to the hard disk 205 is started at the read termination of one document (almost at the same time as the compression termination), the occupation amount of the code buffer 204 increases with the read start of the document and decreases with the read end of the document. When read of the next document is started, the coded data of the document is generated and accumulated in the code buffer 204.

When the coded data of all pages of documents is stored on the hard disk 205, the output operation is started.

The coded data corresponding to the first page is read from the hard disk 205 and is transferred to the code buffer 204 at the first pitch. Since all the coded data of the first page is not necessarily transferred at the first pitch, decompression is not executed and image output is not performed either.

Next, at the second pitch, the coded data corresponding to the second page is read from the hard disk 205 and is transferred to the code buffer 204 and the coded data of the first page already transferred is decompressed, undergoes post-processing by the post-image processing section 202, and is output to the image output unit, whereby an image of the first page is output at the second pitch.

Such processing is repeated as many times as specified in the specified page order, whereby the electronic sort function is executed.

Since the 1-page code amount generated within one pitch is compressed to not greater than the target code amount set based on the amount that can be transferred to the hard disk within one pitch, transfer of the 1-page coded data from the hard disk 205 to the code buffer 204 normally is complete within one pitch at the image output time. Therefore, when the coded data of the next page is transferred to the code buffer 204 at the next pitch, all the coded data of the immediately preceding page should be stored in the code buffer 204. Thus, if the image of the immediately preceding page is output at the pitch at which the coded data of the following page is transferred, missing image data does not occur.

However, such an image processing apparatus has the disadvantage that it is difficult to set the target code amount for the following reason:

As described above, if the generated code amount exceeds the target code amount, the same original document is read twice and it takes time to input an image of the document accordingly. Therefore, from the viewpoint of shortening the time required for image input, if the target code amount is set high so that the generated code amount does not exceed the target code amount (preferably if the target code amount is set to the upper limit, the capacity of data that can be transferred to the hard disk 205 within one pitch), the rescan occurrence probability becomes the lowest, thus efficient image input should be able to be performed.

However, when coded data already stored is read to output an image, some trouble, such as a seek error, may occur on the hard disk 205. In this case, since it takes more time than normal to read the coded data, not all the coded data of the page may be stored in the code buffer 204 within one pitch. If such an accident occurs, decompression is started in a state in which not all the coded data is stored in the code buffer 204. Thus, there is a possibility that an underflow will occur in the code buffer 204 during the compression of the page. If such an underflow occurs, some of the image data decompressed is missing (see original document image 6 in FIG. 15). The larger the code amount of one page, the greater the chance of encountering such an accident.

However, if the target code amount is set low, the generated code amount will often exceed the target code amount and the rescan occurrence probability becomes high, thus the whole processing time cannot be reduced. If a high compression ratio is set in order to lessen the generated code amount, after decompression, the image quality degrades heavily. Further, the generated code amount itself depends on the quality of an input image, as described above.

The factors such as the whole processing time, performance and reliability of hard disk, the image quality after decompression, and the input image quality must be totally considered to set the target code amount, and therefore it must be concluded that it is difficult to set the target code amount, as described above.

SUMMARY OF THE INVENTION

It is therefore an object of the invention to provide an image processing apparatus which inputs and outputs images at a constant pitch, and can secure high image quality after decompression without setting any target code amount while shortening the time required for processing from image input to image output.

To attain the above object, according to a first aspect of the invention, there is provided an image processing apparatus comprising:

input means for causing input of image data;

means for compressing the input image data into coded data;

a main storage section for storing the coded data;

means for buffering a transfer of the coded data from the compressing means to the main storage section;

means for detecting an overflow in the buffering means; and control means for instructing, when the detecting means has detected an overflow, the buffer means to discard coded data of an image which caused the overflow, and continue transferring residual coded data of a preceding image to the main storage section, and for controlling the input means to cause re-input of image data of the image that caused the overflow.

According to a second aspect of the invention, in the image processing apparatus of the first aspect, when the detecting means has detected the overflow, the compressing means compresses the re-input image data at the same compression ratio as applied to the image data that caused the overflow.

According to a third aspect of the invention, there is provided an image processing apparatus comprising:

a main storage section for storing coded data as compressed image data;

means for decompressing the stored coded data into image data;

output means for producing output images of the decompressed image data on a page-by-page basis at a constant time interval;

means for buffering a transfer of the coded data from the main storage section to the decompressing means;

means for detecting an underflow in the buffering means; and control means for instructing, when the detecting means has detected an underflow, the main storage section to continue transferring coded data that caused the underflow to the buffering means, and for causing the output means to again produce an output image of the coded data that caused the underflow.

According to a fourth aspect of the invention, in the image processing apparatus of the third aspect, the output means forms an output image on a sheet, and comprises:

first receiving means for receiving a sheet that is output from the output means when the detecting means has not detected an underflow; and second receiving means for receiving a sheet that is output from the output means when the detecting means has detected an underflow.

According to a fifth aspect of the invention, there is provided an image processing apparatus comprising:

input means for causing input of image data;

means for compressing the input image data into coded data;

a main storage section for storing the coded data;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

first detecting means for detecting an overflow in the buffering means;

second detecting means for detecting an underflow in the buffering means; and control means for instructing, when the detecting means has detected an overflow, the buffer means to discard coded data of an image which caused the overflow, and continue transferring residual coded data of a preceding image to the main storage section, and controlling the input means to cause re-input of image data of the image that caused the overflow; and for instructing, when the detecting means has detected an underflow, the main storage section to continue transferring coded data that caused the underflow to the buffering means, and causing the output means to again produce an output image of the coded data that caused the underflow.

According to a sixth aspect of the invention, there is provided an image processing apparatus comprising:

input means for causing input of image data;

means for compressing the input image data into coded data;

a main storage section for storing the coded data;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

detecting means for detecting an overflow in the buffering means during the image data input operation;

means for storing overflow information indicating on a page-by-page basis whether the detecting means has detected an overflow; and control means for judging, during the image data output operation, whether coded data of a particular page corresponds to image data that caused an overflow in the image data input operation based on the overflow information, and for instructing, if the former corresponds to the latter, the main storage section to continue transferring the coded data of the particular page to the buffering means, and causing the output means to produce an output image of the coded data of the particular page with a delay of one page.

According to a seventh aspect of the invention, there is provided an image processing apparatus comprising:

input means for causing input of image data;

means for compressing the input image data into coded data;

a main storage section for storing the coded data;

means for storing amount information indicating amounts of the coded data on a page-by-page basis;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

means for predicting based on amount information of the coded data of the particular page whether coded data of a particular page will cause an underflow in the buffering means in the image data output operation; and control means for instructing, if the predicting means has predicted that the coded data of the particular page will cause an underflow, the main storage section to continue transferring the coded data of the particular page to the buffer means, and for causing the output means to produce an output image of the coded data of the particular page with a delay of one page.

According to an eighth aspect of the invention, in the image processing apparatus of the seventh aspect, the predicting means predicts further based on amount information of coded data of at least one page that precedes the particular page.

The operation of re-inputting image data is a complete waste in the process of input to storage and takes extra time. Therefore, to complete the whole processing in a short time, re-input operation should be avoided as much as possible.

According to the first aspect of the invention, to compress input image data and store the compressed data in the main storage section, if image data low in compression ratio is input and the code amount of the coded data of the input data exceeds a threshold value, the image data is not again input unless an overflow occurs in the buffering means. Thus, as compared with the prior art wherein the generated code amount is measured for each page and if it exceeds a threshold value, the image data of the page is again input, the number of times image data is again input can be reduced, thus the whole processing speed can be improved.

In the first aspect of the invention, if an overflow occurs, the coded data corresponding to the overflow occurring page is discarded and transfer of the coded data corresponding to the pages preceding the overflow occurring page to the main storage section is continued, so that transfer of the coded data normally buffered is guaranteed. Since image data is again input after a lapse of a given time interval, a considerable amount of coded data has been transferred to the main storage section by the time the image data is again input. Thus, the empty capacity of the buffer means increases, lowering the possibility that an overflow will again occur in the buffering means when the image data is again input.

Therefore, if an overflow is detected, the compression ratio at the re-input time need not be changed; preferably, the again input image data is compressed at the same compression ratio as applied to the image data before the overflow. In doing so, image quality degradation can be lessened in the image data after decompression.

When image data is output, if the coded data read rate from the main storage section lowers or image data low in compression ratio (image data of a large coded data amount) is read consecutively, coded data buffered in the buffer means may run out. Also in this case, the output means outputs image data at given intervals. To normally provide output of all pages, some countermeasures are required.

According to the third aspect of the invention, if coded data buffered in the buffering means runs out, namely, an underflow occurs in the buffer means, read of the coded data corresponding to the underflow occurring page from the main storage section is continued and the output means again executes output. Since the output means again executes output after a lapse of a given time interval, a considerable amount of coded data has been buffered in the buffer means by the time the output means again executes output. Thus, the possibility that an underflow will again occur in the buffering means at the re-output time lowers.

Here, the image data output by the output means when an underflow occurs becomes irregular and thus needs to be distinguished by some means from the normally output image data. According to the fourth aspect of the invention, a normal sheet on which a normal image is formed when no underflow occurred is received by the first receiving means and a sheet on which an irregular image is formed when an underflow occurred is received by the second receiving means, so that the latter sheet can be prevented from being mixed with the former sheet for storage.

According to the fifth aspect of the invention, when image data is input, if an overflow occurs, the possibility that an overflow will again occur in the operation of again inputting the image data can be lowered as in the first aspect of the invention. On the other hand, when image data is output, if an underflow occurs, the possibility that an underflow will again occur in the operation of again outputting the image data can be lowered as in the third aspect of the invention.

By the way, when an overflow occurs at the input time, it means that since the compression ratio of the image data of the page is low and the code amount thereof is large, transfer of the image data from the buffering means to the main storage section is not complete within the input time interval. Thus, it is predicated that transfer of the image data from the main storage section to the buffering means will not be complete within the output time interval at the output time.

In view of the above, in the sixth aspect of the invention, it is assumed that the image data of the overflow occurring page at the input time will cause an underflow to occur at the output time. The output operation is not immediately performed and is executed at the timing corresponding to the next page. That is, if it is predicted that an underflow will occur, the output operation timing is delayed and meanwhile more coded data is buffered in the buffering means.

Additional coded data is buffered in the buffering means before the actual output operation is performed at the timing corresponding to the next page, thus not only lowering the possibility that buffered data may run out, but also solving the problem involved in the fourth aspect of the invention that the sheet on which an image is formed when an underflow occurred is wasted.

In the seventh aspect of the invention, whether or not an underflow will occur at the output time is predicted from the coded data amount of the compression result of image data at the input time. In this case, as in the eighth aspect of the invention, if the coded data amounts of at least one page preceding the page are also referenced at the output time, the prediction accuracy as to whether or not an underflow will occur in the buffering means is raised. Incidentally, in the seventh aspect of the invention, the control on the output means when an underflow is predicted is the same as when an underflow is predicted in the sixth aspect of the invention.

DESCRIPTION OF THE PREFERRED EMBODIMENTS

Figure 1:
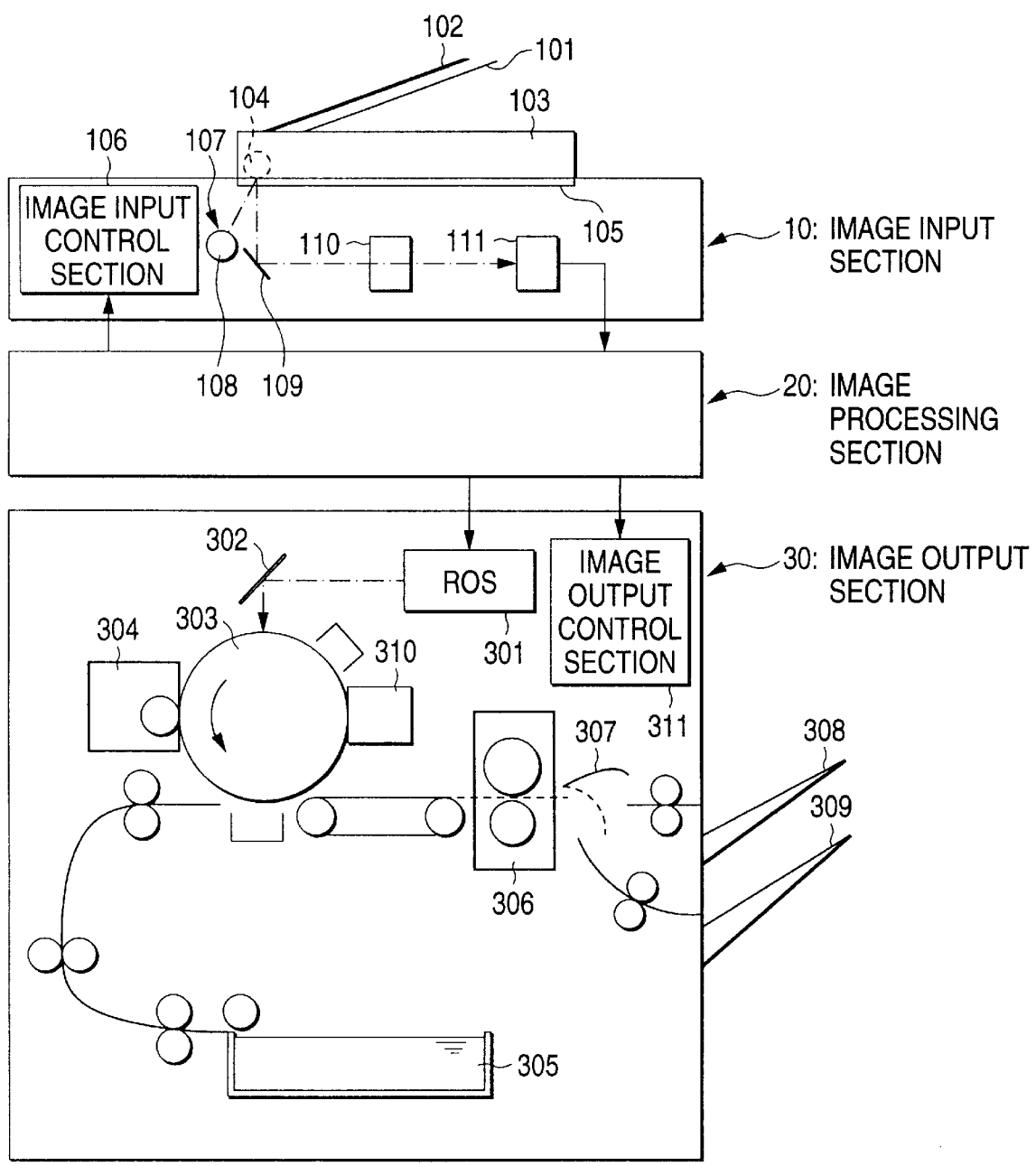
FIG. 1 is an elevational view in section to show the configuration of a digital copier to which image processing sections according to first to third embodiments of the invention are applied.

Referring now to the accompanying drawings, preferred embodiments of the invention will be described below.
First Embodiment FIG. 1 is an elevational view in section to show the configuration of a digital copier in which an image processing apparatus of a first embodiment of the invention is built. In the figure, numeral 10 is an image input section, numeral 20 is an image processing section, and numeral 30 is an image output section.

In the image input section 10, an original document 102 placed on an original document tray 101 is fed by an ADF (auto document feeder) 103 one sheet at a time and is passed through a platen roller 104 and read glass 105 by the platen roller 104, then is discharged to a paper discharge tray (not shown).

This read operation is executed at a constant time interval (pitch) on a page-by-page basis and the operation in the image input section 10 is controlled by an image input control section 106.

A light source unit 107, which is made up of an irradiation lamp 108 and a reflection plate 109 in a piece, can be moved to the left and right in FIG. 1 by drive means (not shown). On the other hand, a lens 110 and a CCD (line) sensor 111 are fixed to the image input section 10.

To use the ADF 103 for consecutively reading an original document one sheet at a time, the light source unit 107 is fixed at the position shown in the figure and the irradiation lamp 108 irradiates the original document fed between the platen roller 104 and the read glass 105 and its reflected light is reflected by the reflection plate. The image of this reflected light is formed by the lens 110, is read by the CCD sensor 111, and is supplied to the image processing section 20 as image data. That is, the original document 102 is vertically scanned as it is fed by the platen roller 104, and is horizontally scanned by the CCD sensor 111 in the perpendicular direction of the figure, whereby the original document 102 is read one sheet at a time and the image data thereof is output.

If the ADF 103 is not used in the image input section 10, the original document 102 is placed on the read glass 105 by the user and the light source unit 107 moves left and right in the figure below the read glass 105 for vertically scanning the original document, thereby reading it.

The image processing section 20, although it will be described later in detail, compresses image data from the image input section 10 and stores the compressed image data as coded data for each page at the input time, and reads the coded data of specified pages as many times as specified in the specified page order, decompresses the read data into the former image data each time, and supplies the image data to the image output section 30 at the output time. Also, the image processing section 20 supplies an image input control signal to the image input section 10 for controlling the input operation thereof and an image output control signal to the image output section 30 for controlling the output operation thereof.

Next, in the image output section 30, a ROS (raster output scanner) 301 drives an internal laser diode in response to image data supplied from the image processing section 20. Light emitted from the laser diode is reflected by a reflection plate 302 and is incident on a photosensitive drum 303, whereby an electrostatic latent image is formed on the photosensitive drum 303. Toner is deposited on the electrostatic latent image by a developing machine 304 for development.

On the other hand, a sheet of paper transported from a sheet tray is transported to the lower face of the photosensitive drum 303 via a predetermined transport passage. When it passes through the lower face, toner deposited on the photosensitive drum 303 is transferred to the sheet. This sheet to which toner is transferred passes through a fuser section 306 and is discharged to either a copy tray 308 or a purge tray 309 as a flap 307 moves up and down. A sheet on which the normal image is formed is discharged to the copy tray; a sheet on which an irregular image is formed is discharged to the purge tray 309 as described later, preventing the latter sheet from being mixed with the former sheet.

The toner deposited on the photosensitive drum 303 is removed by a cleaner 310 by the time new toner is transferred to another sheet.

The operation of the image output section 30 is controlled by an image output control section 311.

Figure 2:
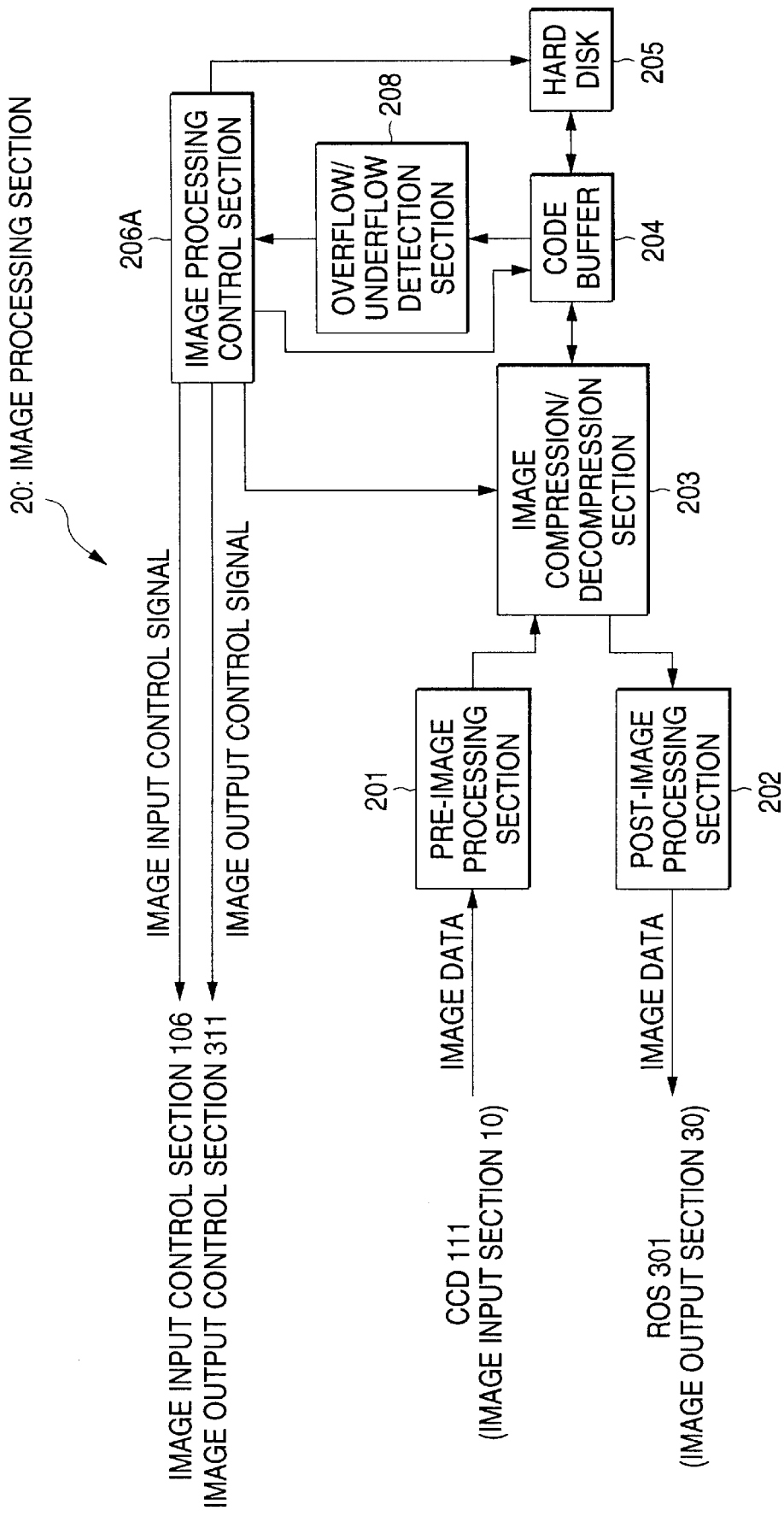
FIG. 2 is a block diagram to show the electric configuration of the image processing section according to the first embodiment of the invention.

Next, the configuration of the image processing section 20 according to the first embodiment of the invention will be discussed. FIG. 2 is a block diagram to show the detailed configuration of the image processing section 20.

In the figure, numeral 201 is a pre-image processing section for executing predetermined image processing such as MTF correction for 1-page image data supplied from the CCD sensor 111 of the image input section 10. On the other hand, numeral 202 is a post-image processing section for executing predetermined image processing such as filtering for decompressed image data and outputting the resultant data to the ROS 301 of the image output section 30.

Numeral 203 is an image compression/decompression section for compressing image data supplied via the pre-image processing section 201 from the image input section 10 in a JPEG system and outputting the compressed data as coded data at the input time and decompressing the coded data into the former image data in the JPEG system at the output time.

The image compression/decompression section 203 has a so-called ping-pong buffer (not shown) comprising two line buffers each having an 8-line buffer capacity inserted in parallel into a port on the side of the pre-image processing section 201 or the post-image processing section 202, and can compress and decompress data consecutively as follows:

In the image compression/decompression section 203, at the input time, image data supplied via the pre-image processing section 201 from the image input section 10 is stored in one line buffer and image data is read from the other line buffer and is compressed. At this time, if 8-line image data is stored in one line buffer, the storage and read line buffers are changed.

On the other hand, at the output time, decompressed image data is stored in one line buffer and image data is read from the other line buffer and is supplied to the image output section 30. At this time, if 8-line image data is read from the other line buffer, the storage and read line buffers are changed.

Thus, the image input section 10 or the image output section 30 and the image compression/decompression section 203 synchronize with each other every eight lines via the line buffers and the line buffers (ping-pong buffer) are changed every eight lines. Each time the line buffers are changed, the image compression/decompression section 203 starts 8-line compression or decompression processing and upon completion thereof, enters a standby state until the line buffers are again changed.

Since the image input section 10 scans and reads an original document at a constant speed, image data is supplied consecutively at a constant rate. The image compression/decompression section 203 synchronizes with the image input section 10 every eight lines via the ping-pong buffer, whereby it can compress image data as soon as the image data is input without waiting for all 1-page image data to be input.

Likewise, since the image output section 30 causes the laser diode to emit light at a constant rate for driving the photosensitive drum 303, image data needs to be supplied consecutively at a constant rate. The image compression/decompression section 203 synchronizes with the image output section 30 every eight lines via the ping-pong buffer, whereby it can supply image data to the image output section 30 as soon as the image compression/decompression section 203 decompresses the image data without waiting for all 1-page image data to be decompressed.

A code buffer 204 is made of a pure electric device such as RAM or FIFO. A hard disk 205 is used for the reason described in the prior art.

Numeral 206A is an image processing control section for controlling the entire image processing section 20; since the image processing control section differs from that shown in FIG. 2 in operation, suffix A is added as 206A. Numeral 208 is an overflow/underflow detection section (OF/UF detection section) for detecting a coded data overflow or underflow in the code buffer 204.

Here, a coded data buffering method in the code buffer 204 and an overflow or underflow detection method of the OF/UF detection section 208 will be discussed.

When an image is input, in the code buffer 204, the write address is incremented for writing compressed code data thereinto. When the compressed coded data is transferred to the hard disk 205, the read address is incremented in a manner following the write address for reading the coded data in the code buffer 204, thereby buffering the coded data. The coded data normally is written and read in a time-sharing mode.

For example, if the code buffer 204 has a capacity of 64 kbytes, write or read address in incremented starting at "10000." When "FFFF" is reached, again it is incremented starting at "0000." That is, considering a circle with the capacity of the code buffer as one round, the read address makes circular motion so as to rotate in the same direction as the rotation direction of the write address and follows the write address.

When an image is input, coded data is supplied from the image compression/decompression section 203 at a higher rate than data is transferred to the hard disk 205 and therefore the write address is incremented faster than the read address is incremented. Thus, after a lapse of reasonable time since coded data was written into a certain write address, different coded data is written into the write address. If a read address catches up with the write address before different coded data is written into the write address, the preceding coded data is already read and the write address is empty as an available write region at the time. Conversely, if a read address does not catch up with one write address into which coded data has been written and the coded data in the write address is not yet read, the write address is not empty and not an available write region at the time. Thus, the subsequent coded data loses its write location and becomes missing (an overflow occurs).

For this reason, the OF/UF detection section 208 monitors write and read addresses. When an image is input, if the write address passes the read address that should be incremented in the rear, the OF/UF detection section 208 detects an overflow.

Likewise, when an image is output, in the code buffer 204, the write addresses is incremented for writing of coded data read from the hard disk 205. When the coded data is supplied to the image compression/decompression section 203, the read address is incremented so as to follow the write address for reading the coded data, thereby buffering the coded data.

However, when an image is output, the coded data is read from the hard disk 205 at lower rate than data is supplied to the image compression/decompression section 203 and therefore the write address is incremented slower than the read address in contrast to the case of the image input time.

Thus, when an image is output, the read address may pass the write address (an underflow occurs), which is opposite to the case of the image input time. In this case, the coded data is not normally buffered either. The OF/UF detection section 208 monitors write and read addresses. When an image is output, if the read address passes the write address that should be incremented in the front, the OF/UF detection section 208 detects an underflow.

Such detection is executed when general RAM is used for the code buffer 204. If the code buffer is an FIFO buffer, an overflow or underflow can be detected by monitoring the read and write addresses.

Next, the operation of the image processing apparatus will be discussed. First, the image input operation will be discussed. The blocks are controlled by the image processing control section 206A.

At the beginning, an original document is read at a given pitch every page through the image input section 10 and image data is generated each time. The image data is subjected to pre-processing by the pre-image processing section 201, is compressed by the image compression/decompression section 203, and is buffered in the code buffer 204. The OF/UF detection section 208 monitors the write and read addresses for detecting an overflow occurring in the code buffer 204 when the image is input.

At the time, if a reasonable amount of coded data is stored in the code buffer 204, the coded data is read and transferred to the hard disk 205. That is, unlike the prior art, the coded data transfer start timing is the moment in time at which a reasonable amount of coded data is stored rather than the moment in time at which compression of 1-page image data is complete. The reasonable amount of coded data may be, for example, one block defined in the transfer protocol of the hard disk 205 or a code amount corresponding to the amount resulting from compressing 8-line image data as much as the capacity of the line buffer.

The coded data transfer start timing is hastened in order to complete transfer to the hard disk as fast as possible and lessen the capacity required for the code buffer 204.

If an overflow does not occur, the image processing control section 206A instructs the image input section 10 to the next page of the original document at the next pitch and causes the image data generated by reading the page to be compressed, buffered, and transferred as described above. In this case, read of coded data of the preceding page and write of coded data of the following page may be executed concurrently in the code buffer 204.

By the way, when an image is input, if image data of a page low in compression ratio and large in generated coded amount is read in consecutive pitches or some trouble occurs on the hard disk 205, the code amount supplied from the image compression/decompression section 203 to the code buffer 204 becomes larger than that transferred from the code buffer 204 to the hard disk 205 and the possibility that an overflow will occur in the code buffer 204 increases. If such an overflow occurs, it means that the coded data of the page read and compressed at the point in time is missing. Then, the image processing control section 206A performs the following error handling.

The image processing control section 206A causes the image compression/decompression section 203 to stop compression processing performed at the point in time, returns the write address of the code buffer 204 to the top of the page, and instructs the image input section 10 to again read the same page of the original document at the next pitch, whereby the image compression/decompression section 203 enters a standby state until image data of the page is input at the pitch and the code buffer 204 discards the coded data of the page read and compressed when the overflow occurred.

Since the transfer start timing is hastened, a part of the coded data of the page read and compressed when the overflow occurred may be transferred to the hard disk 205 before the coded data is discarded from the code buffer 204. In this case, the image processing control section 206A returns the write address of the hard disk 205 to the top of the page, whereby the coded data of the page read and compressed when the overflow occurred is also discarded from the hard disk 205.

Coded data preceding the page read and compressed when the overflow occurred may exist in the code buffer 204 depending on the code amount occurrence state. In this case, the image processing control section 206A continues to transfer the coded data to the hard disk 205, whereby the empty area of the code buffer 204 is enlarged from that when the overflow occurred by the time the image data of the page is input at the next pitch. Therefore, when the same page of the original document is again read, if the compression ratio is not raised to lessen the generated code amount, an overflow does not again occur and moreover there is no fear that the image quality will be degraded at the decompression time.

Such processing is executed by the time image data of all pages of the original document is stored on the hard disk 205.

Figure 3:
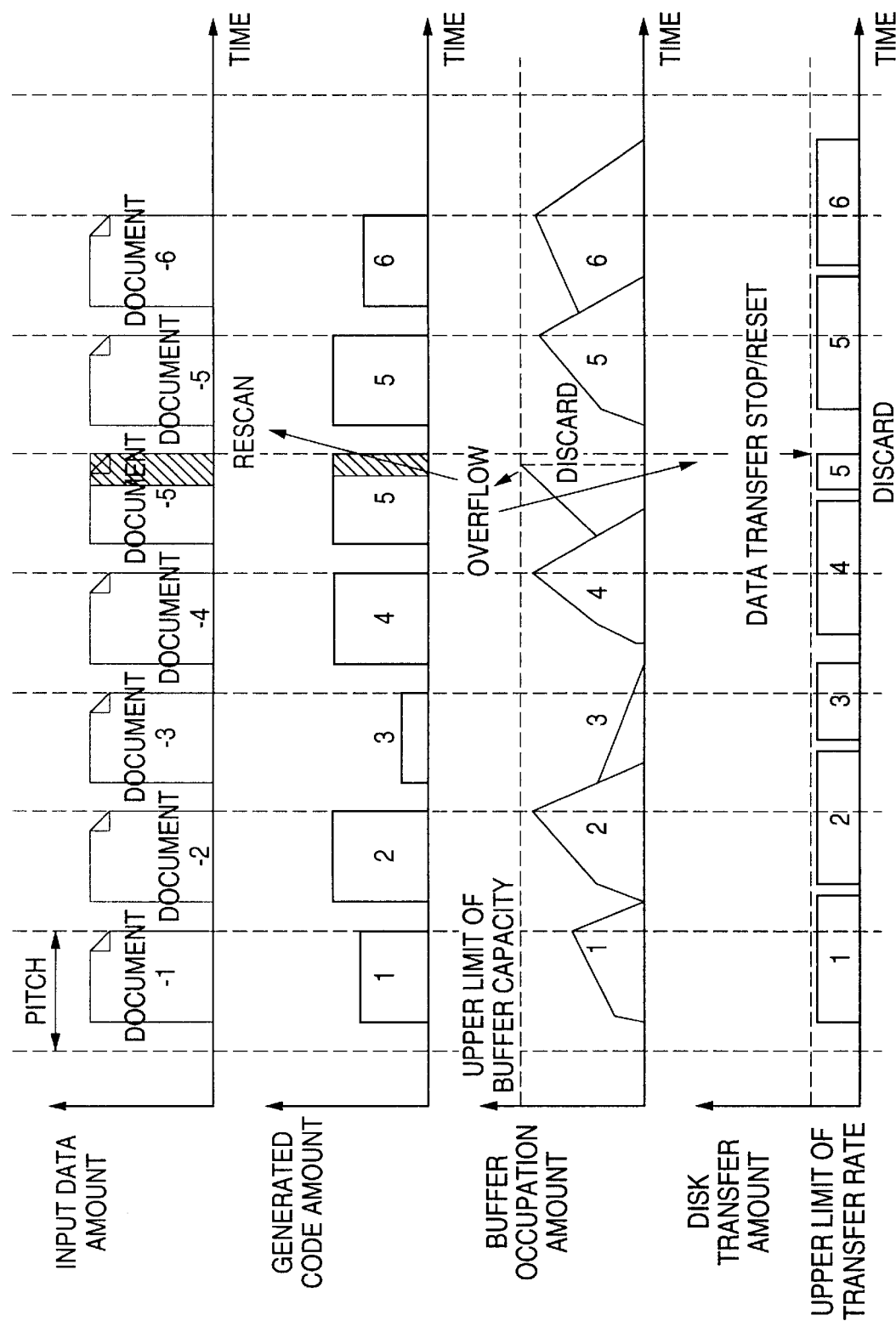
FIG. 3 is a chart to explain the image input operation in the first embodiment of the invention.

FIG. 3 shows the specific image input operation in the embodiment. As shown here, since original documents 4 and 5 have large generated code amounts and are continuous pages, an overflow occurs at the read pitch of original document 5 and original document 5 is rescanned.

In the example, a part of the coded data of original document 5 is already transferred to the hard disk 205 when an overflow occurs at the read pitch of original document 5. Therefore, in this case, the coded data of original document 5 not only in the code buffer 204, but also on the hard disk 205 is discarded, as described above.

In FIG. 3, the reason why the buffer occupation amount in each of original documents 1, 2, 4, and 5 rises rapidly in the beginning part and then somewhat gently in the later part is that the coded data transfer start timing is the moment in time at which a reasonable amount of coded data is stored in the code buffer 204.

That is, until then, the coded data is only supplied from the image compression/decompression section 203 and is not transferred to the hard disk 205 and therefore the buffer occupation amount rises rapidly, but after the point in time, the coded data is transferred to the hard disk concurrently, so that the buffer occupation amount rises gently. Therefore, such a phenomenon does not occur for original document 3 or 6 because the coded data thereof is stored in the code buffer 204 in an accumulating manner on the preceding coded data.

The image processing section according to the embodiment has the following advantages when an image is input:

(1) In the embodiment, the target code amount need not be set. If the compression ratio of 1-page image data lessens and the generated code amount exceeds the amount that can be transferred to the hard disk 205 within the period of one pitch, rescan does not occur unless an overflow occurs in the code buffer 204. Normally, the compression ratio of 1-page image data lessens on rare occasion and input of such an original document with continuous pages is also rare, thus the overflow occurrence possibility becomes extremely low. For this reason, the number of rescan occurrence times when an image is input can be minimized and the whole processing speed can be improved. In the example in FIG. 3, since original documents 4 and 5 have large generated code amounts and are continuous pages, an overflow occurs only at the read pitch of original document 5.

(2) If an overflow occurs, it is not necessary to execute control so as to raise the compression ratio at the rescan time, so that image quality degradation does not occur.

(3) If some unexpected trouble occurs on hard disk and the transfer rate lowers substantially, such image input processing can solve the missing data problem.

Next, the image output operation in the image processing apparatus will be discussed. Also in this case, the image processing control section 206A controls the blocks.

At the first pitch, the coded data of the first page for image output is read from the hard disk 205 and is transferred to the code buffer 204 for storage.

At the second pitch, the coded data of the first page stored in the code buffer 204 is decompressed by the image compression/decompression section 203 and is subjected to post-processing by the post-image processing section 202, then output to the image output section 30, whereby image output of the first page is performed at the pitch. The transfer start timing from the hard disk 205 to the code buffer 204 does not necessarily match the start timing of image output. If a 1-block or more empty area exists in the code buffer 204, 1-block data is transferred.

Thus, focusing attention on the storage state in the code buffer 204 at one pitch, coded data of more than one page may be already stored or only coded data of less than one page may be stored. On the other hand, focusing attention on the transfer rate, data supply from the code buffer 204 to the image compression/decompression processing section 203 for decompression processing is faster than data supply from the hard disk 205 to the code buffer 204 for transfer processing.

Therefore, when pages having coded data with a large generated code amount is output consecutively or when some trouble occurs on the hard disk and the data transfer rate lowers, an underflow in which stored coded data goes out may occur in the code buffer 204 at the image output time.

However, unless an underflow occurs, as described above, image output of the preceding page is performed and the coded data of the following page is transferred from the hard disk 205 to the code buffer 204, whereby 1-page image output is normally provided at one pitch in the image output section 30.

However, if an underflow occurs, decompression processing is performed with coded data run out. Resultantly, an incomplete image is formed and mixed with a normal image in the image output section 30. Thus, the image processing control section 206A performs the following control:

When detecting an underflow in the code buffer 204, the OF/UF detection section 208 sends an interrupt signal to the image processing control section 206A for informing the underflow. When receiving the interrupt signal indicating the underflow occurrence, the image processing control section 206A first instructs the image compression/decompression processing section 203 to stop decompression processing performed at the point in time and instructs the image output section 30 to execute purge processing, whereby the image compression/decompression processing section 203 is placed in a standby state until the next pitch and the image output section 30 discharges the page being output at the current pitch to the purge tray 309.

The image processing control section 206A restores the read address of the coded data of the page transferred from the hard disk 205 to the code buffer 204 at the moment in time at which the underflow occurred to the top address of the page, and allows the coded data of the page to be transferred from the hard disk 205. Since the image compression/decompression processing section 203 is in the standby state and decompression processing is stopped, a considerable amount of coded data is stored in the code buffer 204 by the time decompression processing is started at the next pitch. Thus, an underflow does not again occur at the next pitch.

The image processing control section 206A again decompresses the coded data of the page where the underflow occurred at the preceding pitch, and outputs the decompressed coded data to the image output section 30.

Purge processing of the image output section 30 performed when an underflow occurs will be discussed.

When the image processing section 10 sends an underflow occurrence notification to the image output control section 311 in the image output section 30 shown in FIG. 1, the image output control section 311 causes the flap 307 to move down for discharging the sheet of paper with an incomplete image formed at the point in time to the purge tray 309. When the sheet is actually discharged to the purge tray 309, the image output control section 311 causes the flap to move up to the former position for discharging the sheet of paper passed through the fuser section 306 to the copy tray 308. Thus, the sheet onto which an image was output at the pitch at which the underflow occurred is discharged to the purge tray 309 and other sheets are discharged to the copy tray 308.

Figure 4:
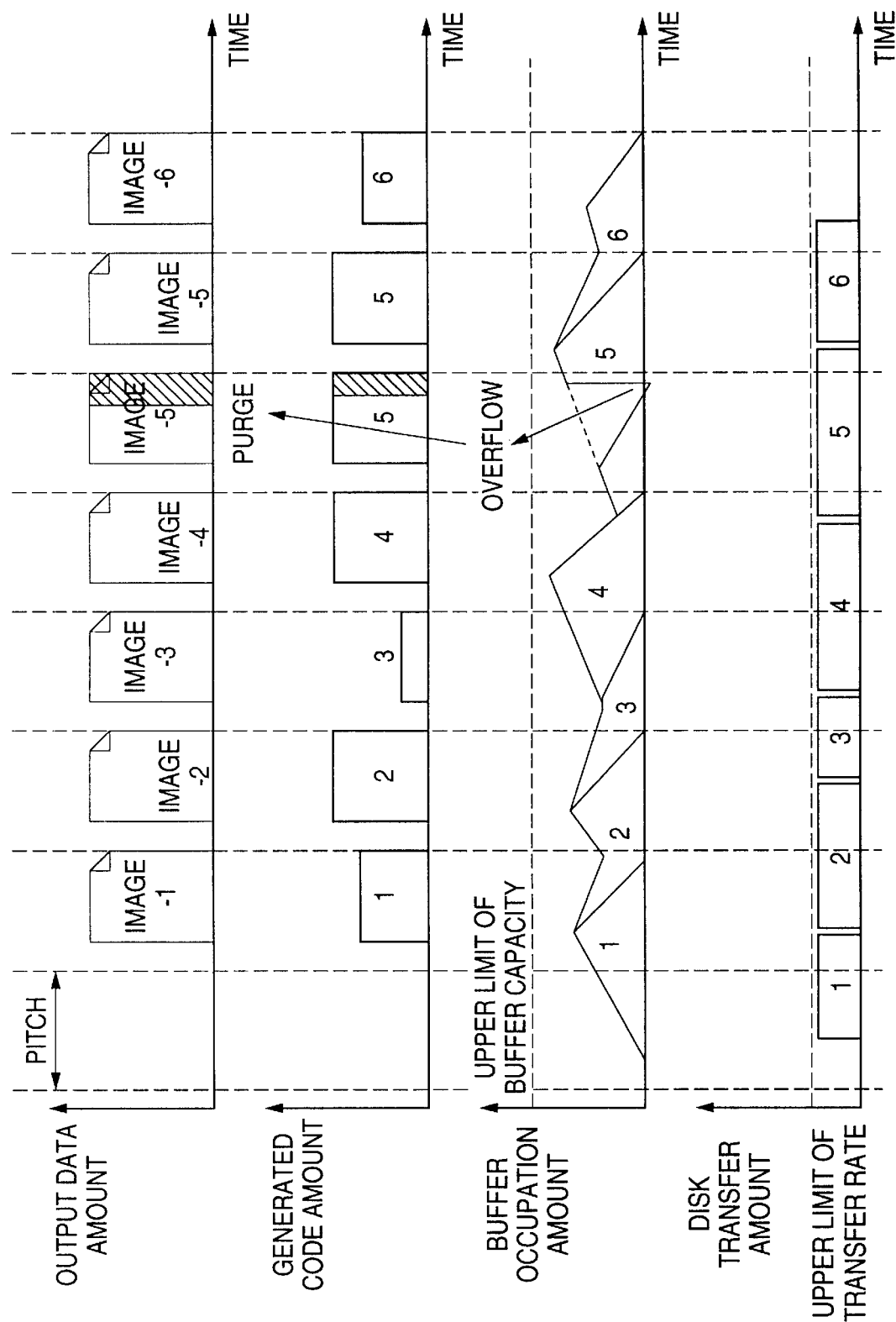
FIG. 4 is a chart to explain the image output operation in the first embodiment of the invention.

FIG. 4 shows the specific image output operation in the embodiment. As shown here, since original documents 4 and 5 have large generated code amounts and are continuous pages, an underflow occurs at the read pitch of original document 5 and purge processing is performed for original document 5.

In the example in FIG. 4, the reason why the buffer occupation amount increases suddenly just after an underflow occurs at original document 5 is that the read address of the code buffer 204 is restored to the top address of the page onto which an image was output at the underflow occurrence time. That is, the read address of the code buffer 204 returns to the top address of the page, whereby the coded data read until the underflow occurred is apparently restored.

The image processing section 20 according to the embodiment has the following advantages when an image is output:

(1) In the embodiment, if coded data is stored on the hard disk 205 in a state in which the compression ratio of 1-page image data is set small and the generated code amount is large, and exceeds the amount that can be transferred to the hard disk 205 within the period of one pitch when it is read, an irregular image is not output to the image output section 30 unless an underflow occurs in the code buffer. 204. Normally, the compression ratio of 1-page image data lessens on rare occasion and input of such an original document with continuous pages is furthermore rare, thus the underflow occurrence possibility is extremely low. For this reason, the number of purge processing execution times when an image is output can be minimized and the whole processing speed can be improved. In the example in FIG. 4, since original documents 4 and 5 have large generated code amounts and are continuous pages, an underflow occurs only at the read pitch of original document 5.

(2) If an underflow occurs, the sheet of paper with an irregular image formed is discharged to the purge tray 309 and thus is not mixed with the sheets with a normal image formed.

(3) If some unexpected trouble occurs on hard disk 205 and the transfer rate lowers substantially, such image output processing can handle the accident.

Second Embodiment

Next, an image processing section 20 according to a second embodiment of the invention will be discussed. In the second embodiment, at the image input time, information as to whether or not an overflow occurred while 1-page image data was being input is stored for each page. At the image output time, the information is referenced for predicting whether or not an underflow will occur. If it is predicted that an underflow will occur, image output on and after the page is shifted backward one pitch. That is, in the embodiment, if it is predicted that an underflow will occur, image output is not performed at the pitch and coded data is only stored for preventing an actual underflow from occurring.

Figure 5:
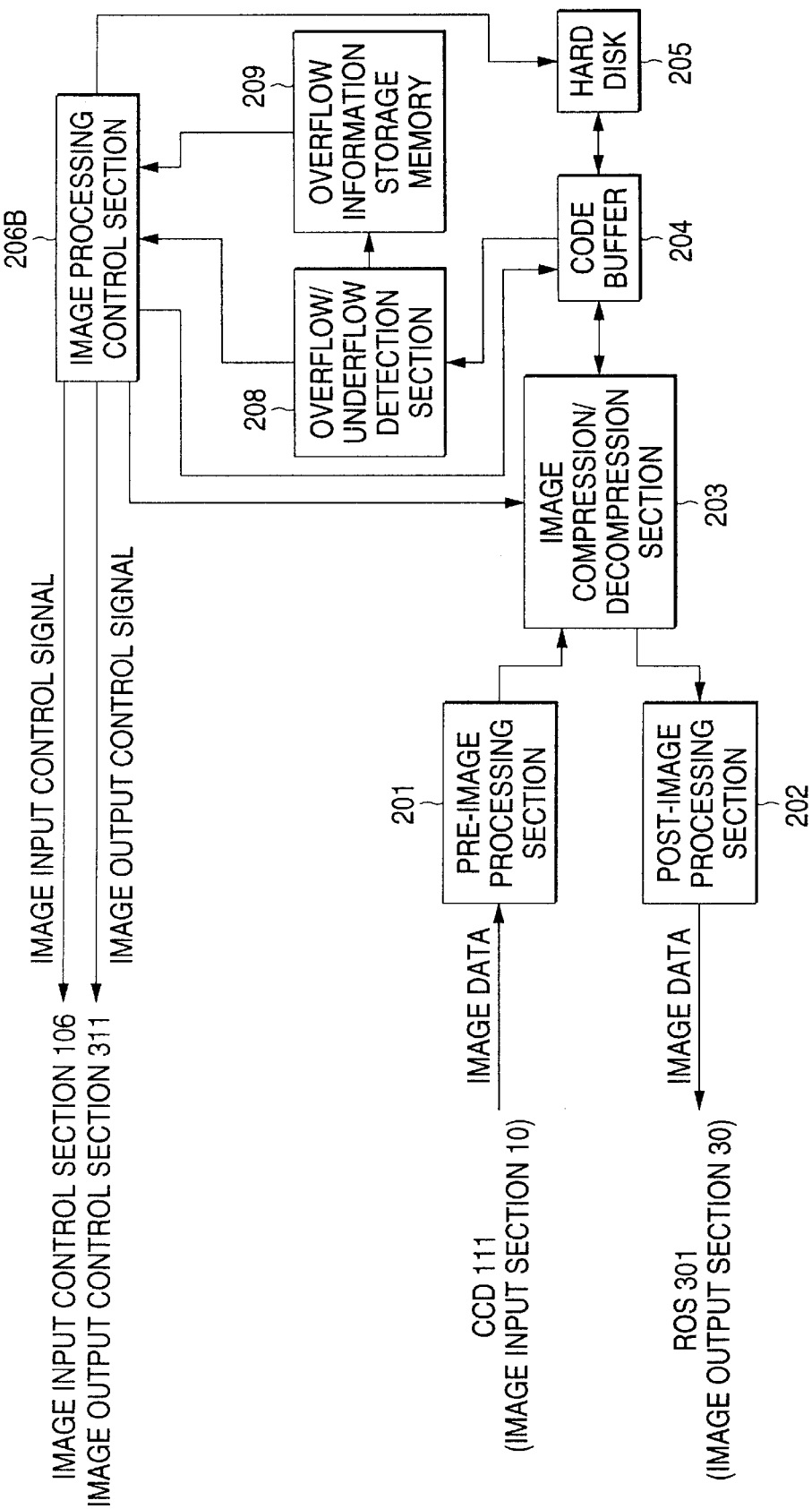
FIG. 5 is a block diagram to show the electric configuration of the image processing section according to the second embodiment of the invention.

FIG. 5 shows the configuration of the image processing section 20 according to the second embodiment of the invention. The image processing section 20 in FIG. 5 differs from the image processing section according to the first embodiment shown in FIG. 2 in that it has an overflow information storage memory 209 for storing information as to whether or not an overflow occurred while 1-page image data was being input for each page at the image input time. Thus, an image processing control section in the image processing section according to the second embodiment also differs from the image processing control section according to the first embodiment somewhat in operation and is assigned numeral 206B in the sense.

Next, the operation of the image processing section 20 according to the second embodiment will be discussed. At the image input time, information as to whether or not an overflow occurred while 1-page image data was being input for each page is stored in the overflow information storage memory 209.

The image processing section 20 is the same as that in the first embodiment in other points of the operation. That is, if a reasonable amount of coded data is stored in a code buffer 204 at one pitch, the coded data is read from the code buffer 205 and is transferred to a hard disk 205. If an overflow occurs in the code buffer 204, compression processing is stopped until the next pitch on and after the point in time, and the write address of the code buffer 204 is returned to the top of the page for reading the same page of the original document at the next pitch.

The overflow occurring page is input twice containing rescan and an overflow does not occur at the second time for the reason described in the first embodiment. The fact that an overflow occurred at the first input time is stored for the page.

On the other hand, at the image output time, the image processing control section 206B performs the following control:

First, the image processing control section 206B reads the coded data of the first page for image output from the hard disk 205 and transfers the read data to the code buffer 204 for storage at the first pitch. At the second pitch, it causes an image compression/decompression section 203 to decompress the coded data of the first page stored in the code buffer 204 and output the decompressed data to an image output section 30. The image processing control section 206B repeats the operation as many times as specified in the order of the pages for image output, as in the first embodiment. Unlike the first embodiment, just before starting the operation of the image output section 30, the image processing control section 206B checks whether or not an overflow occurred when the image data of the page was compressed, and performs the appropriate operation according to the check result. A description will be given centering around this point.

At an image output pitch, more particularly just before starting the operation of the image output section 30, the image processing control section 206B checks the storage contents of the overflow information storage memory 209 to see if an overflow occurred when the image data of the page for image output at the pitch was compressed.

If an overflow occurred when the image data was compressed, the image processing control section 206B determines that the page contains a large code amount of coded data and therefore that the probability that an underflow will occur at decompression of the coded data of the page is high, and performs the following error handling:

If an overflow occurred when the image data was compressed, the image processing control section 206B instructs the image compression/decompression section 203 to skip decompression processing of the coded data of the page between the pitch and the next pitch. Since transfer of the coded data of the page from the hard disk 205 to the code buffer 204 is continued meanwhile, no underflow will occur if decompression processing is restarted at the next pitch.

The image processing control section 206B instructs the image output section 30 to perform skip operation. Generally, in the image formation process of the image output section 30 shown in FIG. 1, a sheet onto which a latent image of the photosensitive drum 303 is transferred is discharged through the fuser section 306. Thus, the sheet is transported so that the tip thereof matches the latent image formation start point of the photosensitive drum 303. However, if the probability that an underflow will occur is high for the page for image output, the image processing section 20 informs the image output control section 311 of the fact in the form of an output control signal. In response to the signal, the image output control section 311 stops transport of the sheet until the next pitch. This is the skip operation.

Figure 6:
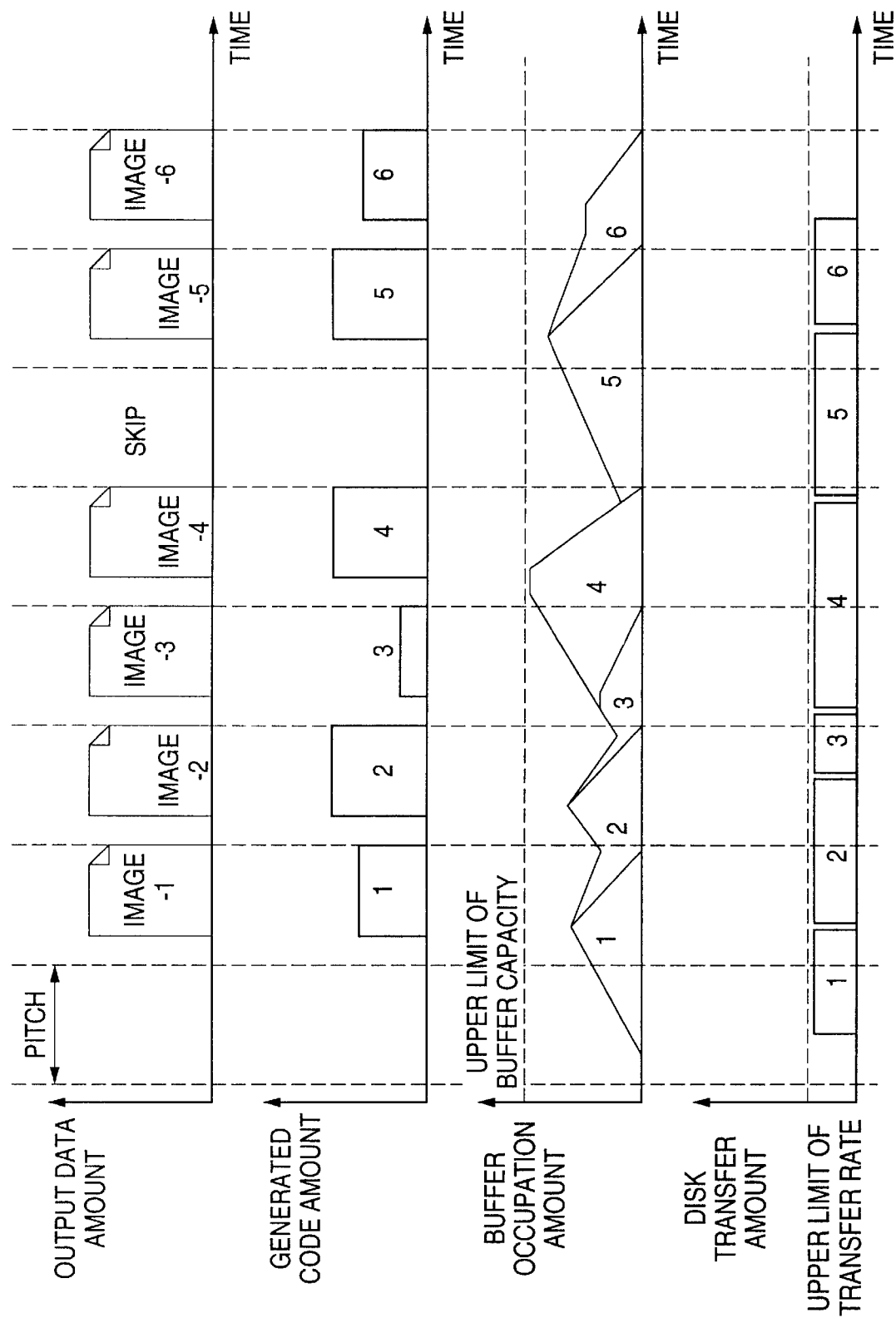
FIG. 6 is a chart to explain the image output operation in the second embodiment of the invention.

The specific image output operation in the embodiment will be discussed. As shown in FIG. 3, since original documents 4 and 5 have large generated code amounts and are continuous pages, an overflow occurred at the input pitch of original document 5. Thus, the fact that an overflow occurred for document 5 is stored in the overflow information storage memory 209. Therefore, in image output in the embodiment, the information stored in the overflow information storage memory 209 is referenced just before the image output start timing of document 5. Resultantly, image formation of document 5 is skipped backward one pitch, as shown in FIG. 6.

In the second embodiment, information as to whether or not an overflow occurred at the image input time is referenced and when the overflow occurrence page is output, 1-pitch skip operation is performed, thereby preventing an underflow from occurring in the code buffer 204 at the decompression time of the data of the page. As compared with the first embodiment, the second embodiment can eliminate formation of an incomplete image on a sheet and can also eliminate the need for the flap 30 or the purge tray 309 in the first embodiment.

Third Embodiment

Next, an image processing section 20 according to a third embodiment of the invention will be discussed. In the third embodiment, at the image input time, information concerning the generated code amount of 1-page image data is stored for each page. At the image output time, the information is referenced for predicting whether or not an underflow will occur. If it is predicted that an underflow will occur, image output on and after the page is shifted backward one pitch. That is, in the embodiment, if it is predicted that an underflow will occur, image output is not performed at the pitch and coded data is only stored for preventing an actual underflow from occurring, as in the second embodiment.

Figure 7:
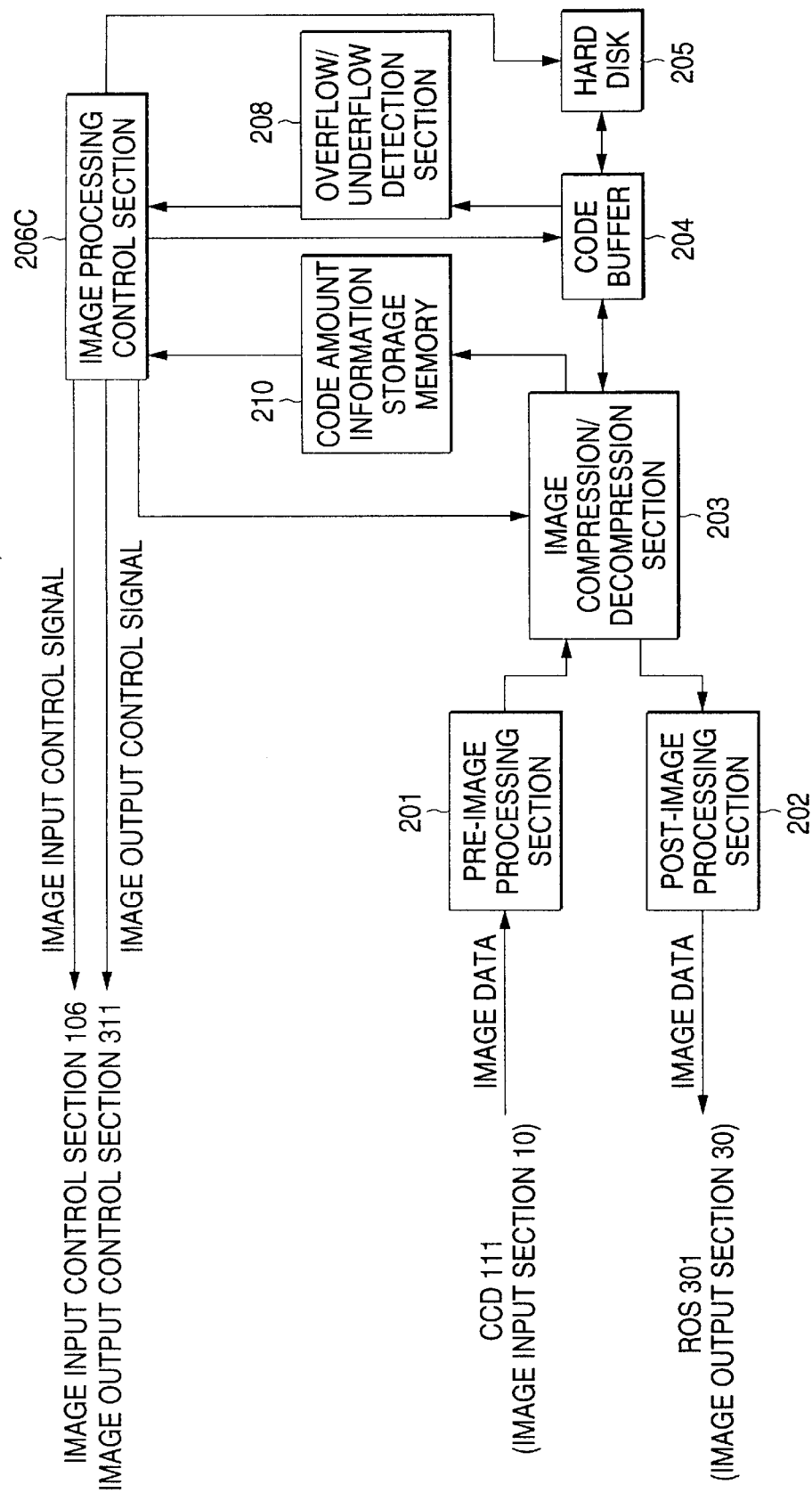
FIG. 7 is a block diagram to show the electric configuration of the image processing section according to the third embodiment of the invention.

FIG. 7 shows the configuration of the image processing section 20 according to the third embodiment of the invention. The image processing section 20 in FIG. 7 differs from the image processing section according to the first embodiment shown in FIG. 2 in that it has a code amount information storage memory 210 for storing information on the generated code amount resulting from coding 1-page image data for each page at the image input time. Thus, an image processing control section in the image processing section according to the third embodiment also differs from the image processing control section according to the first embodiment somewhat in operation and is assigned numeral 206C in the sense.

Next, the operation of the image processing section 20 according to the third embodiment will be discussed. At the image input time, the generated code amount of 1-page image data compressed by an image compression/decompression section 203 is stored in the code amount information storage memory 210 for each page.

The image processing section 20 is the same as that in the first embodiment in other points of the operation. That is, if a reasonable amount of coded data is stored in a code buffer 204 at one pitch, the coded data is read from the code buffer 205 and is transferred to a hard disk 205. If an overflow occurs in the code buffer 204, compression processing is stopped until the next pitch on and after the point in time, and the write address of the code buffer 204 is returned to the top of the page for reading the same page of the original document at the next pitch.

If an overflow occurs, compression processing at the pitch is stopped and is again performed at the next pitch. No overflow occurs at the second time for the reason described in the first embodiment. For such a page, the code amount generated when no overflow occurs at the second input time is stored in the code amount information storage memory 210.

On the other hand, at the image output time, the image processing control section 206C performs the following control:

First, the image processing control section 206C reads the coded data of the first page for image output from the hard disk 205 and transfers the read data to the code buffer 204 for storage at the first pitch. At the second pitch, it causes an image compression/decompression section 203 to decompress the coded data of the first page stored in the code buffer 204 and output the decompressed data to an image output section 30. The image processing control section 206C repeats the operation as many times as specified in the order of the pages for image output, as in the first embodiment. Unlike the first or second embodiment, just before starting the operation of the image output section 30, the image processing control section 206C references the code amount of the page and performs the appropriate operation according to the code amount of the page. A description will be given centering around this point.

At an image output pitch, more particularly just before starting the operation of the image output section 30, the image processing control section 206C checks the storage contents of the code amount information storage memory 210 to find the code amounts of the coded data corresponding to the page for image output at the pitch and the immediately preceding page. Next, it determines whether or not the sum of the 2-page code amounts is greater than a predetermined value.

If the image processing control section 206C determines that the sum is greater than the predetermined value, it determines that the probability that an underflow will occur in the code buffer 204 at decompression of the coded data of the page is high, and performs the following error handling:

If the sum of the code amounts of the coded data corresponding to the page for image output at the pitch and the immediately preceding page is greater than the predetermined value, the image processing control section 206C instructs the image compression/decompression section 203 to skip decompression processing of the coded data of the page between the pitch and the next pitch. Since transfer of the coded data of the page from the hard disk 205 to the code buffer 204 is continued meanwhile, no underflow will occur if decompression processing is restarted at the next pitch.

The image processing control section 206C instructs the image output section 30 to perform skip operation as in the second embodiment.

Figure 8:
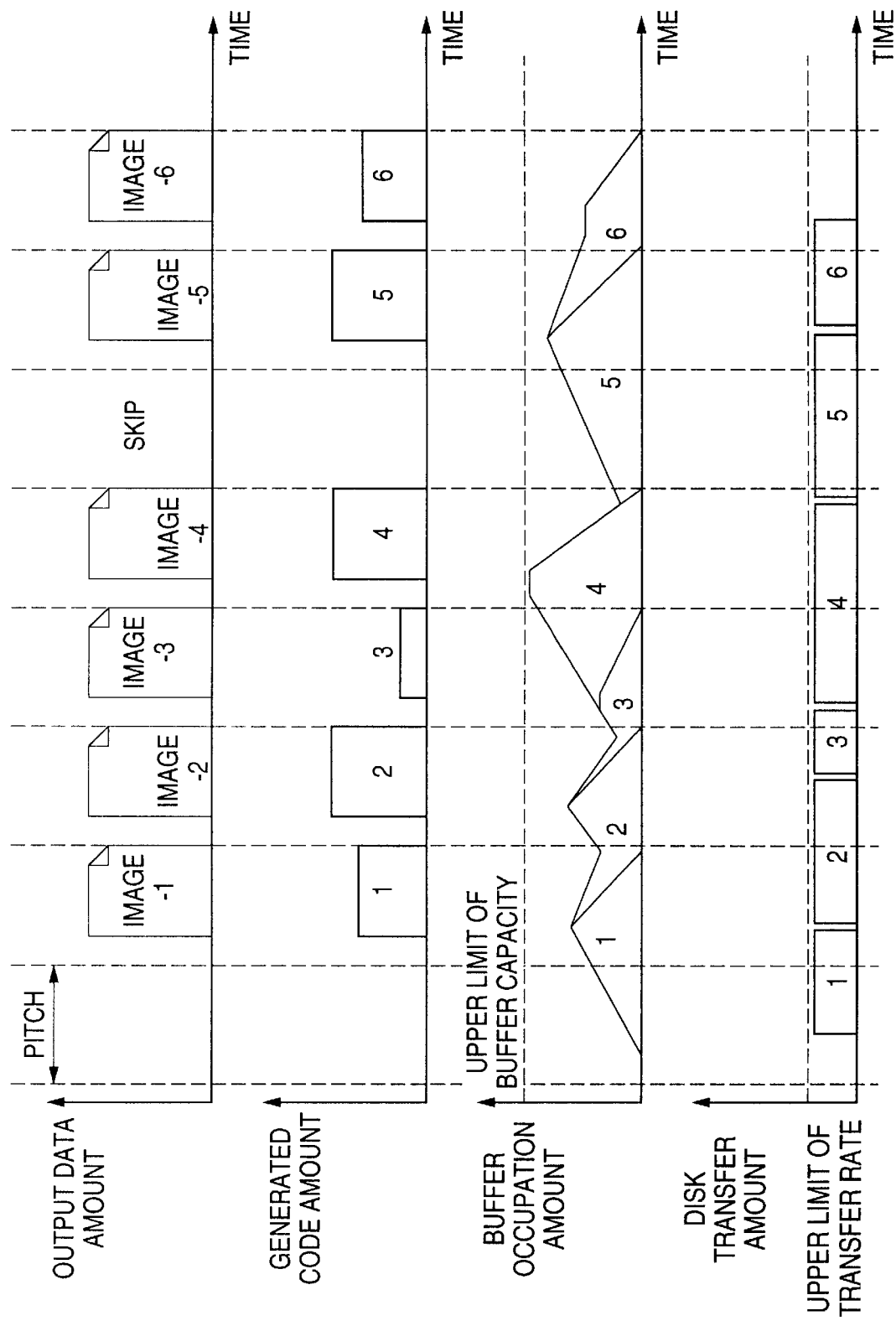
FIG. 8 is a chart to explain the image output operation in the third embodiment of the invention.

The specific image output operation in the embodiment will be discussed. As shown in FIG. 8, since original documents 4 and 5 have large generated code amounts and the total code amount is greater than the predetermined value. Therefore, in the third embodiment, image output of document 5 is skipped backward one pitch.

In the third embodiment, whether or not an underflow will occur is predicted by determining whether or not the sum of the code amounts of the page for image output and the immediately preceding page is greater than a predetermined value, but the prediction is not limited to it. For example, whether or not an underflow will occur may be predicted by determining whether or not the total 3-page code amount of the page for image output, the immediately preceding page, and the preceding page exceeds a predetermined value, whereby whether or not an underflow will occur can be predicted more accurately.

Further, whether or not an underflow will occur may be predicted based on the cumulative code amount of the page for image output and all pages preceding the page. In this case, preferably whether or not an underflow will occur at the pitch is predicted by determining whether the cumulative code amount of data will be all transferred until the end of the pitch just before the operation of the image output section 30 is started (when whether or not an underflow will occur is determined).

In the third embodiment, at the image input time, information on the generated code amount is stored for each page and at the image output time, the code amounts of the page and its preceding page are referenced and whether or not an underflow will occur is predicated by determining whether or not the sum of the code amounts is greater than a predetermined value. If it is predicated that an underflow will occur, 1-pitch skip operation is performed, thereby preventing an underflow from occurring in the code buffer 204 at the decompression time of the data of the page. As compared with the first embodiment, the third embodiment can eliminate formation of an incomplete image on a sheet and can also eliminate the need for the flap 30 or the purge tray 309 in the first embodiment.

Fourth Embodiment

Next, an image processing apparatus according to a fourth embodiment of the invention will be discussed. The image processing apparatus according to the fourth embodiment provides a print image storage function and an electronic sort function in a network printer.

Figure 9:
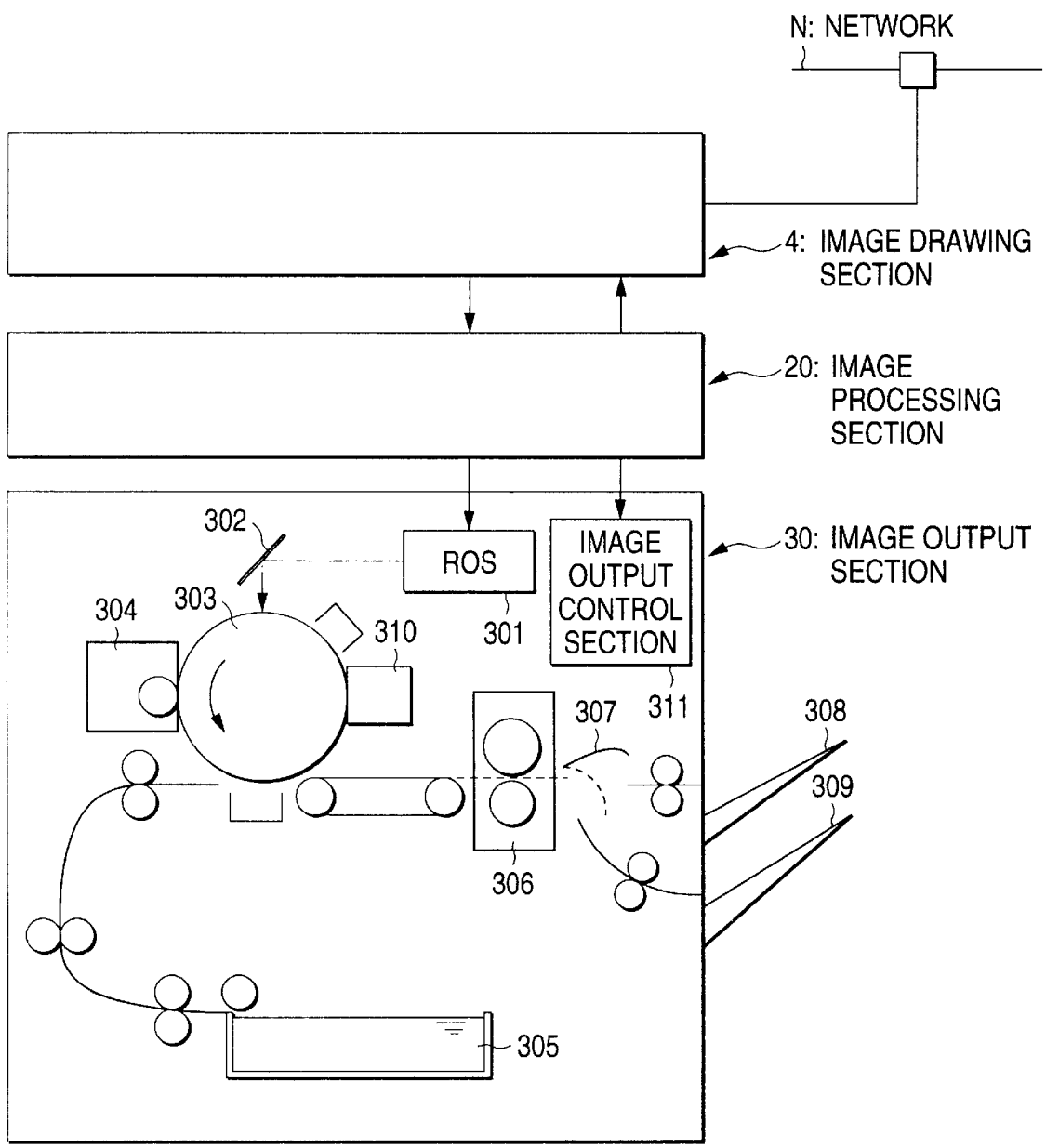
FIG. 9 is an elevational view in section to show the configuration of a network printer to which an image processing section according to a fourth embodiment of the invention is applied.

FIG. 9 is an elevational view in section to show the configuration of a network printer in which the image processing apparatus of the embodiment is built.

The network printer shown in FIG. 9 differs from the digital copier in FIG. 1 mainly in image data input configuration. That is, the network printer has an image drawing section 4 for expanding data supplied via a network N to image data of a raster image in place of the image input section 10 in FIG. 1. Normally, the data supplied via the network N is described in a page description language (PDL).

Figure 10:
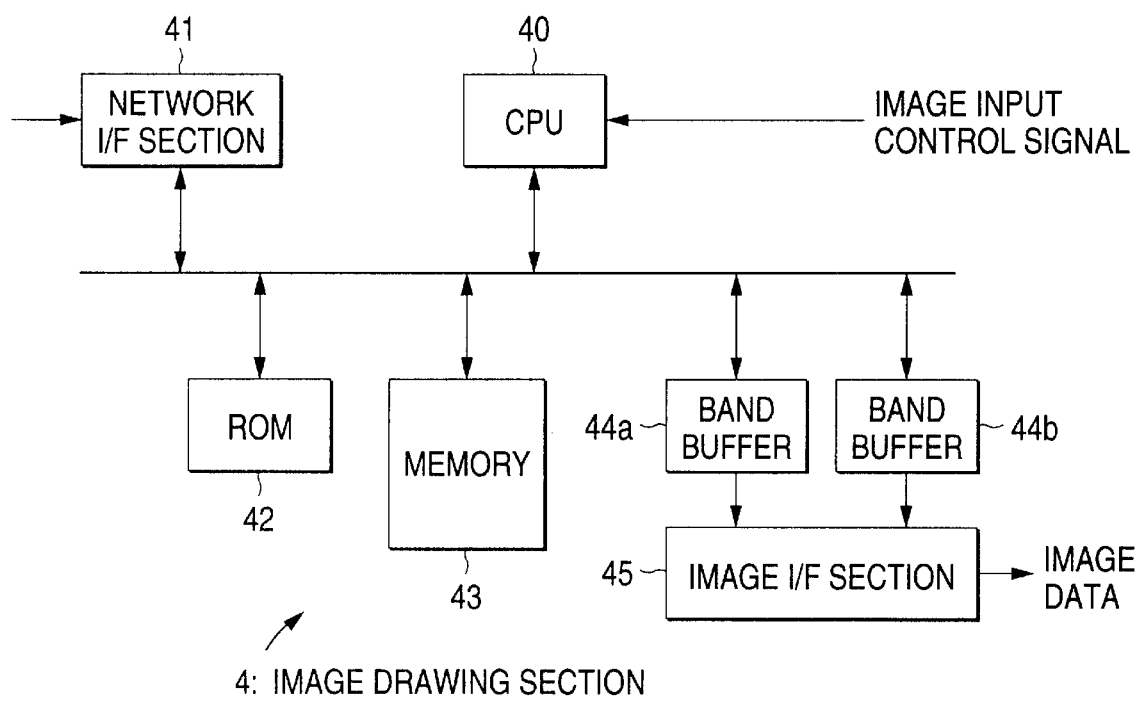
FIG. 10 is a block diagram to show the electric configuration of an image drawing section in the network printer.

The configuration of the image drawing section 4 will be discussed with reference to FIG. 10.

In the figure, a CPU 40 controls the members of the image drawing section 4 via a bus B. A network interface section 41 receives data supplied via the network N. A font ROM 42 stores outline (scalable) font data. In the embodiment, if data described in the PDL contains character print command code, the corresponding outline font data is read from the font ROM 42 and is expanded to the specified character size. A memory 43 temporarily stores various pieces of data generated when the CPU 40 performs processing.

The image drawing section 4 raster-expands an image in band units. The band mentioned here is provided by dividing an image like a band in the vertical scanning direction; in the embodiment, a 1-page image is divided into 16 bands in the vertical scanning direction.

Band buffers 44a and 44b store band images. An image interface section 45 supplies image data supplied from the band buffer 44a or 44b to an image processing section 20.

While the CPU 40 raster-expands the image of one band and stores the resultant image data in one of the band buffers, the image data of the expansion result of the band preceding that band is supplied from the other band buffer to the image processing section 20. That is, the band buffer for storing the image data of the expansion result and that for supplying image data to the image processing section 20 are changed alternately for each band, whereby the memory amount required for raster expansion can be reduced as compared with that required for raster-expanding a 1-page image in batch.

Figure 11:
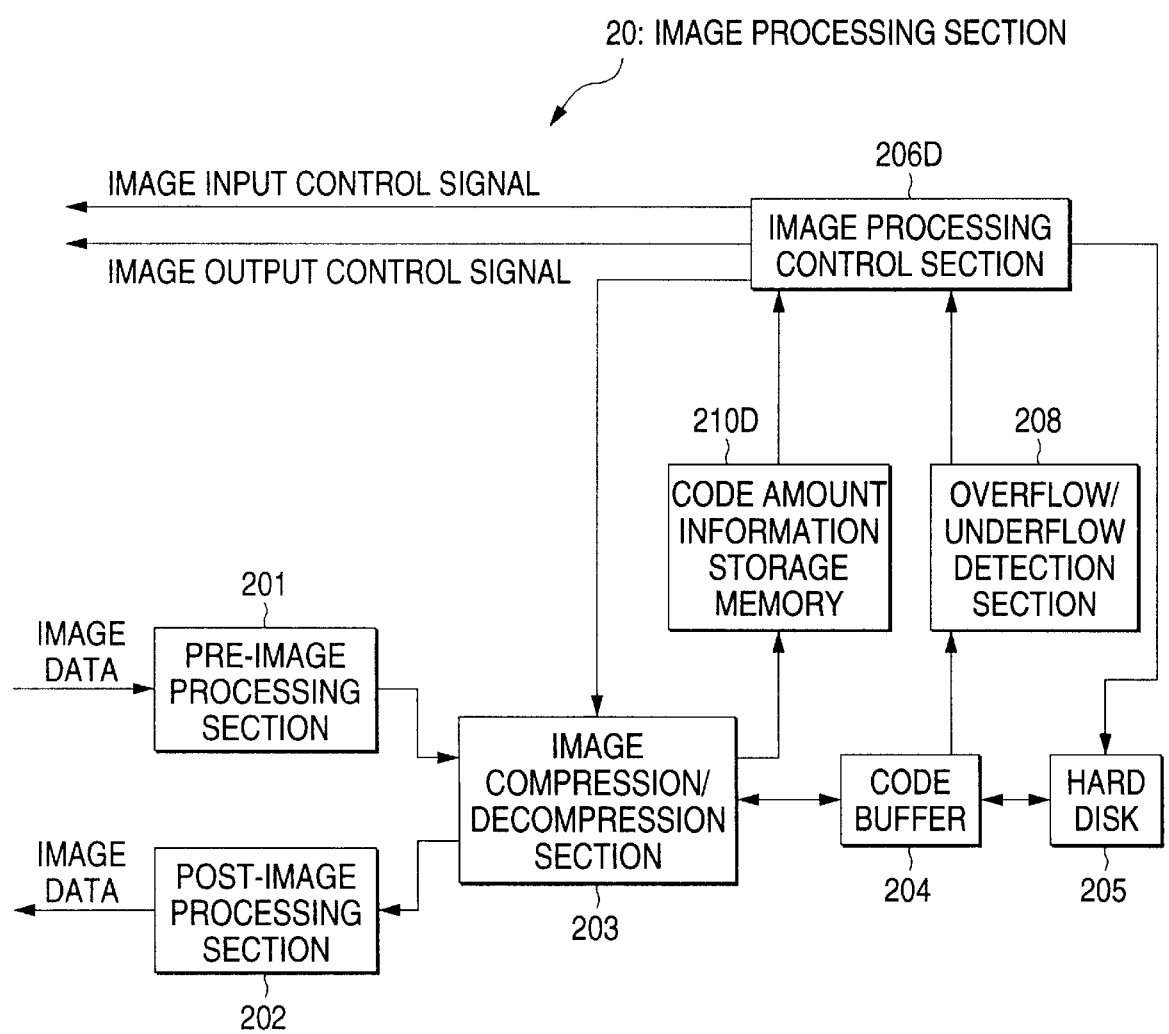
FIG. 11 is a block diagram to show the electric configuration of the image processing section according to the fourth embodiment of the invention.

The image processing section 20 according to the embodiment will be discussed with reference to FIG. 11. It has the same configuration as the image processing section according to the third embodiment (see FIG. 7) except for image processing control section. A code amount information storage memory 210D stores the code amount information on a band-by-band rather than on a page-by-page basis.

In the fourth embodiment, a page output synchronizing signal PageSync is supplied from an image output section 30 to an image control section 206D (not shown), whereby the image processing section 20 can recognize a pitch at the image output time.

The operation of the network printer will be discussed. First, the image input operation will be described.

The time required for raster-expanding an image that is in units of bands in the image drawing section 4 varies depending on the contents of the image data of the image. Thus, in the embodiment, the image data raster-expanded is not directly output to the image output section 30 and is once stored in the image processing section 20.

More particularly, the image data in units of bands that has been raster-expanded by the image drawing section 4 is supplied to an image compression/decompression section 203 via a pre-image processing section 201 and is compressed on a band-by-band basis. When 1-band image data is compressed, the image processing control section 206D is informed of the generated code amount of the image data in the form of an interrupt signal and the coded data as much as the code amount is transferred from a code buffer 204 to a hard disk 205 for storage.

Thus, in the embodiment, image data is input to the image processing section 20 intermittently on a band-by-band basis rather than at a constant pitch on a page-by-page basis, and all input image data is divided into bands for storage in the image processing section 20.

In the embodiment, compression of band image data and storage of the compressed image data on the hard disk 205 need not be executed in a constant pitch unlike the copiers in the first to third embodiments, because each time image data is raster-expanded in band units by the image drawing section, the resultant data is transferred to the image compression/decompression section 203 for compression, then the compressed data is stored on the hard disk 205.

If an overflow occurs in the code buffer 204 while the image compression/decompression section 203 compresses image data related to one band, the image processing control section 206D recognizes the overflow in response to an interrupt signal from an OF/UF detection section 208 and performs the following processing.

First, the image processing control section 206D causes the image compression/decompression section 203 to stop compression processing executed at the moment in time at which the overflow occurred, and restores the write address of the code buffer 204 to the top address of the band, whereby the coded data corresponding to the overflow occurring band is discarded from the code buffer 204.

Next, the image processing control section 206D instructs the image drawing section 4 to again output image data of the overflow occurring band. Upon reception of the instruction, the image drawing section 4 stops the current image data output at the point in time and stands by for a given time, then again outputs the image data of the overflow occurring band from the beginning. While the image drawing section 4 stands by for the given time, transfer of coded data from the code buffer 204 to the hard disk 205 is promoted, thereby enlarging an empty capacity of the code buffer 204 for lowering the possibility that an overflow will occur in the code buffer 204 when the image data of the overflow occurring band is again output.

Such image data input processing is executed each time the image drawing section 4 completes raster expansion in band units. Finally, the 1-page print image is divided into the coded data corresponding to 16 bands for storage on the hard disk 205. This operation is repeated for all pages to be printed.

After all print images are compressed in band units and the compressed data is stored on the hard disk 205, the following image output operation is started. (Incidentally, it is executed at a constant pitch on a page-by-page basis as in the copiers according to the first to third embodiments.)

At the first pitch, the coded data corresponding to 16 bands making up the first page is read from the hard disk 205 and is stored in the code buffer 204. In the subsequent pitches, the coded data corresponding to the second page is transferred to the code buffer 204 and the coded data stored in the code buffer 204 at the preceding pitch is transferred to the image compression/decompression section 203 for decompression, then decompressed data is output to the image output section 30.

At the pitch start point in time, if all coded data corresponding to 16 bands making up the page whose output is to be started is stored in the coded buffer 204, logically an underflow cannot occur in the code buffer 204 in decompression processing of the page. Therefore, in such a case, the image processing control section 206D instructs the image compression/decompression section 203 starts decompression of the coded data corresponding to the page and instructs the image output section 30 to execute output in response to the image data resulting from the decompression.

On the other hand, at the pitch start point in time, if not all coded data corresponding to 16 bands making up the page whose output is to be started is stored in the coded buffer 204, an underflow can occur in the code buffer 204 in decompression processing of the page. Then, in such a case, the image processing control section 206D executes the following underflow occurrence prediction processing for predicting whether or not an underflow will occur, and performs appropriate processing according to the prediction result:

Then, the underflow occurrence prediction processing will be discussed.

Figure 12:
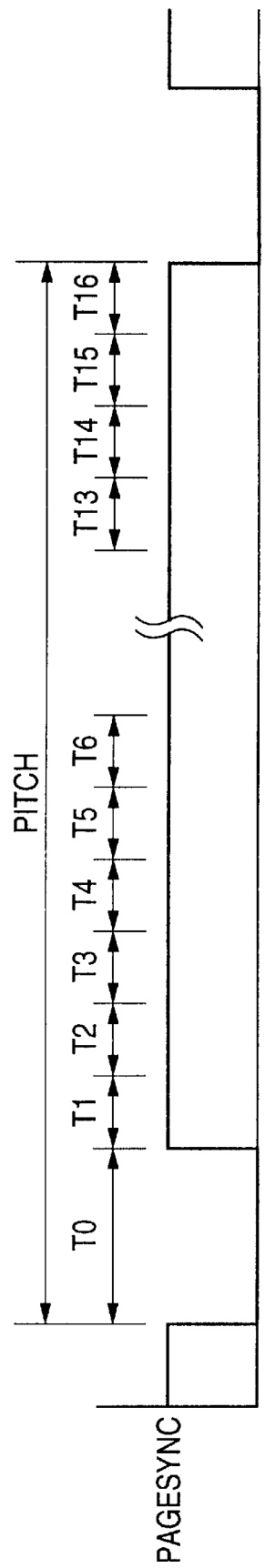
FIG. 12 is a chart to explain the decompression operation in the fourth embodiment of the invention.
Figure 13:
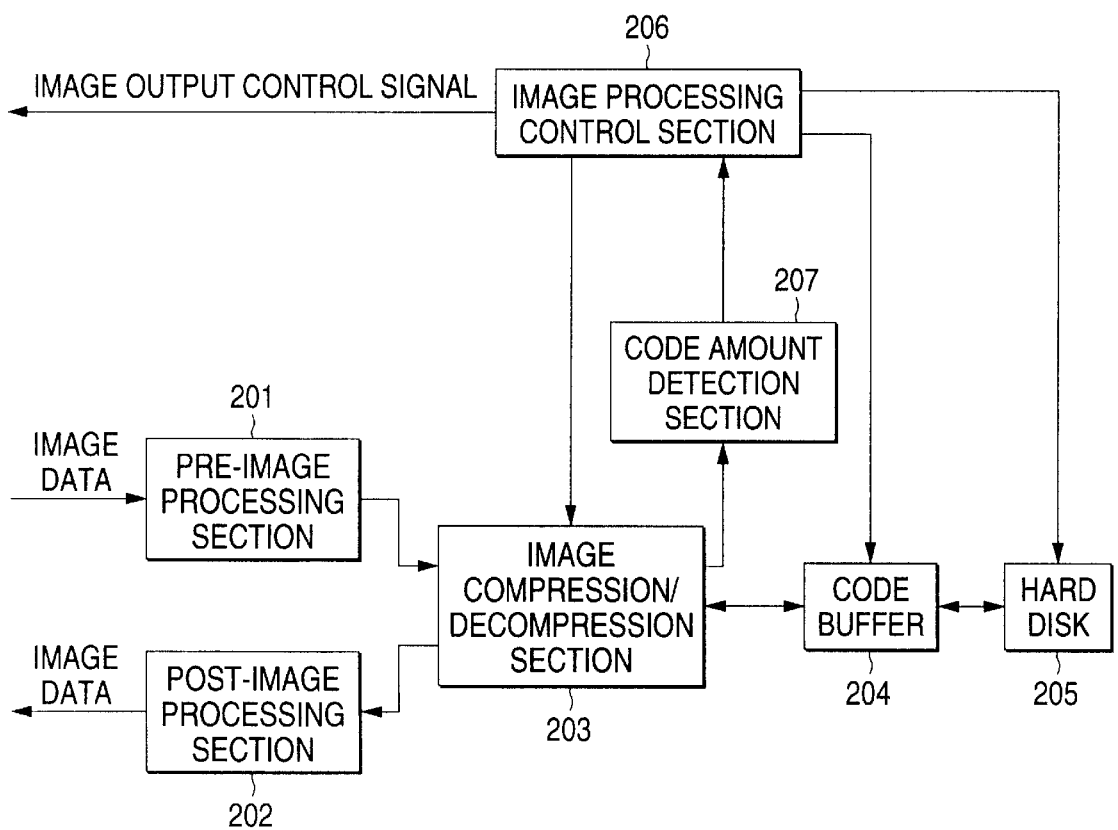
FIG. 13 is a block diagram to show the electric configuration of a conventional image processing apparatus.
Figure 14:
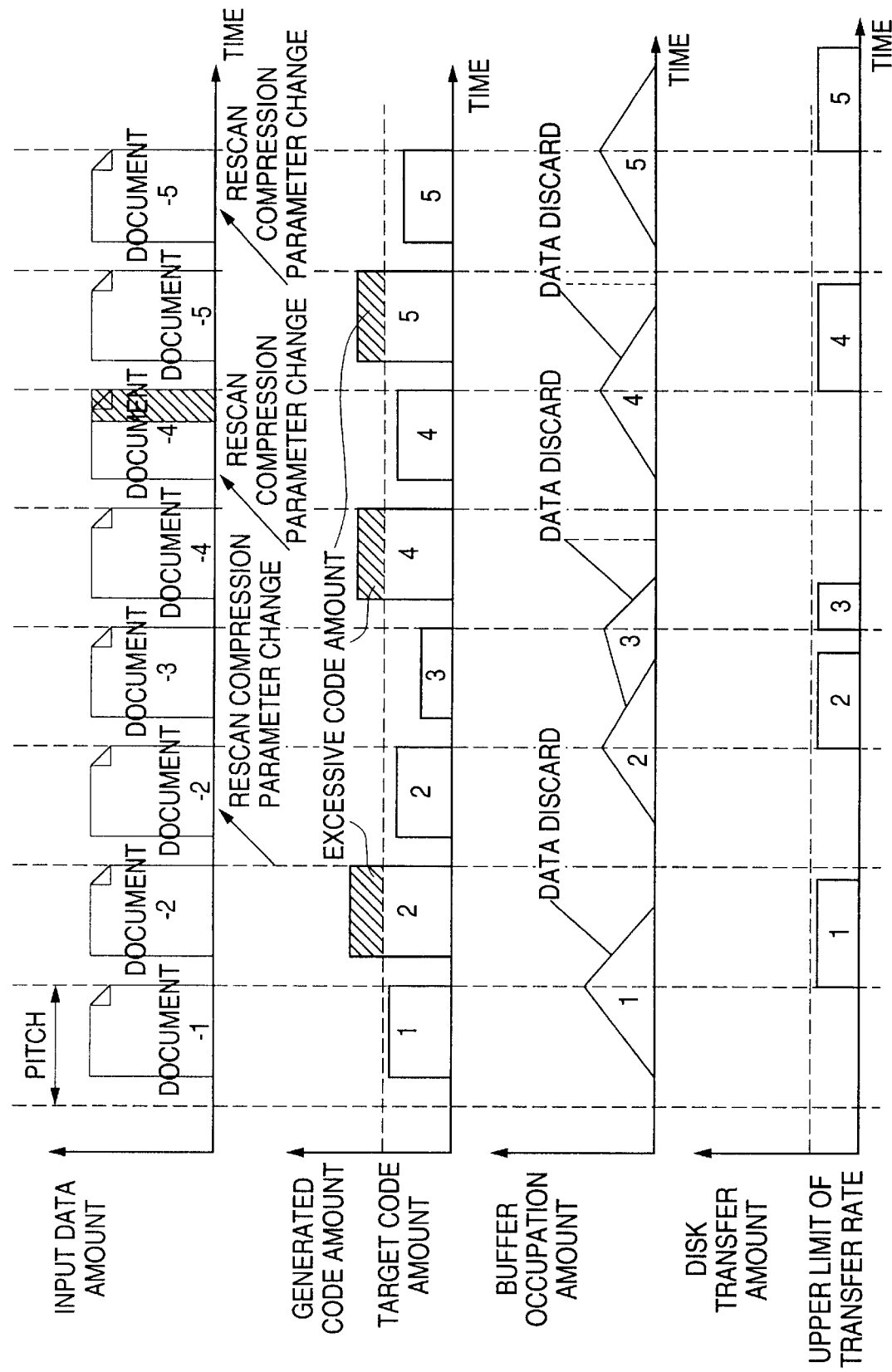
FIG. 14 is a chart to explain the image input operation in the image processing apparatus in FIG. 13.
Figure 15:
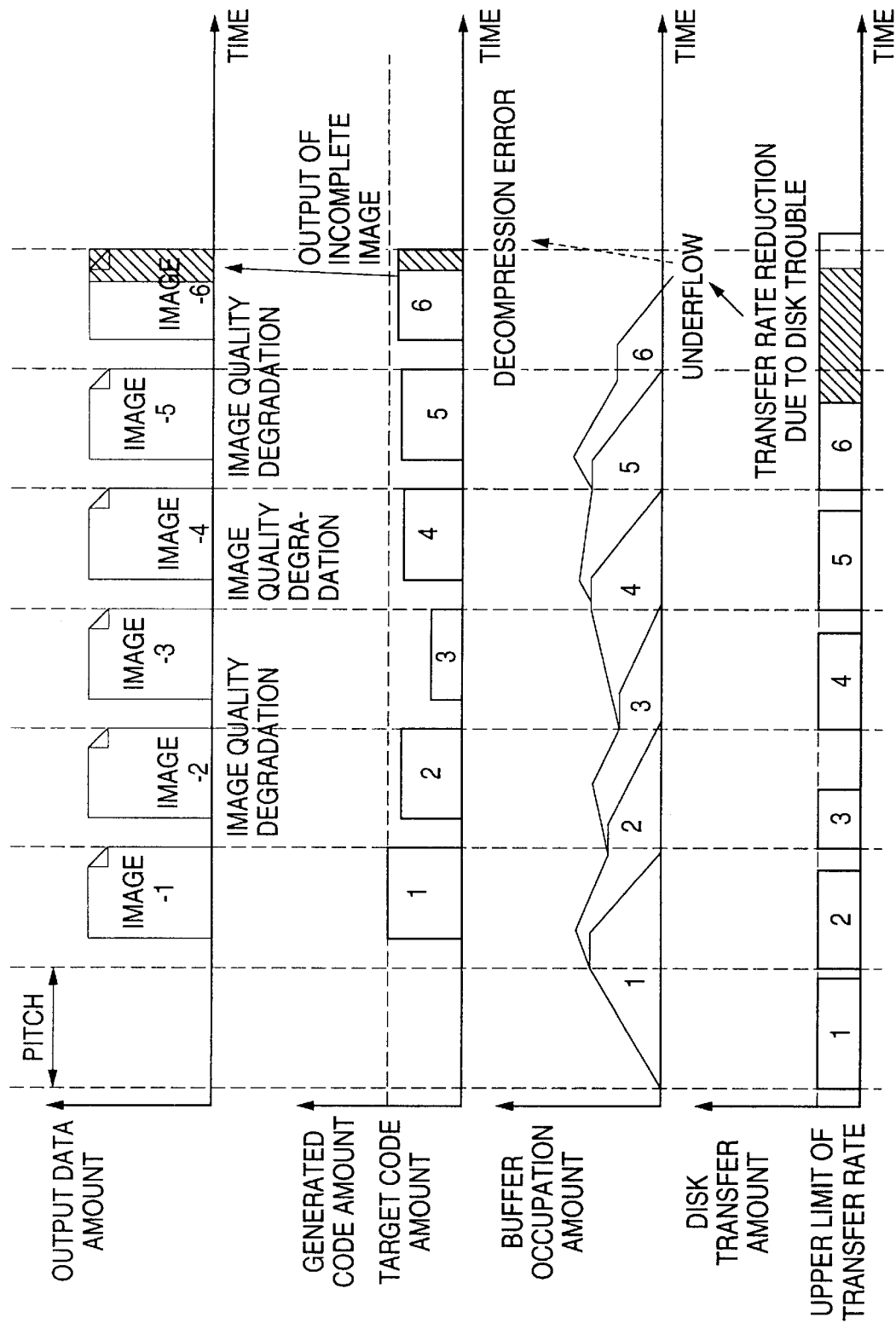
FIG. 15 is a chart to explain the image output operation in the image processing apparatus in FIG. 13.

First, a pitch applied when image output is repeated consecutively is divided into time sections as shown in FIG. 12 for consideration.

As shown here, the pitch refers to the time between one falling edge of synchronizing signal PageSync and the next falling edge thereof. When the synchronizing signal PageSync is high, it indicates that image data is valid. Then, the image processing control section 206D instructs the image compression/decompression section to start decompression processing on the rising edge of the synchronizing signal PageSync and output the resultant image data through a post-image processing section to the image output section 30 in synchronization with the synchronizing signal PageSync.

In FIG. 12, time T0 denotes the time between the instant when the pitch is started, namely, underflow occurrence prediction processing is started and the instant when actual decompression processing is started. Conversely, decompression processing is not executed during time T0. Time Ti (i is an integer ranging from 1 to 16) denotes the time during which the coded data related the ith band in a print image is decompressed.

First, the image processing control section 206D references the code amount information storage memory 210D to check the coded data for each band related to the page to be output at the pitch for the code amount not yet transferred to the code buffer 204 from the hard disk 205 at the pitch start point in time.

Next, the image processing control section 206D calculates the data amount that can be transferred from the hard disk 205 to the code buffer 204 during time T0 until the image output start by multiplying the transfer rate of the hard disk 205, namely, the data amount transferred per unit time by time T0.

If the data amount that can be transferred during time T0 is equal to or less than the current empty capacity of the code buffer 204, the image processing control section 206D calculates how many bands the data amount is equivalent to the data amount of. On the other hand, if the data amount that can be transferred during time T0 exceeds the current empty capacity of the code buffer 204, the image processing control section 206D assumes that the data amount is the same as the empty capacity of the code buffer 204, and calculates how many bands the data amount is equivalent to the data amount of.

Next, the image processing control section 206D predicts the transfer completion time of coded data not yet transferred to the code buffer 204 at the end of time T0 for each band. This prediction can be calculated from the code amount of the coded data corresponding to each band and the transfer rate from the hard disk 205.

The image processing control section 206D checks the relationship between the transfer completion time and times T1- T16 for each band.

More particularly, if the transfer completion prediction time of the coded data for every band precedes the time during which each band is transferred, it means that when the coded data of the band is decompressed, all the coded data of the band is already stored in the code buffer 204. Then, the image processing control section 206D predicts that no underflow will occur in the code buffer 204. Therefore, in this case, the image processing control section 206D instructs the image compression/decompression section 203 starts decompression of the coded data corresponding to the page and instructs the image output section 30 to execute output in response to the image data resulting from the decompression.

On the other hand, if the transfer completion prediction time of the coded data of one band is behind the time during which the band is transferred, the image processing control section 206D predicts that an underflow will occur in the code buffer 204. Therefore, in this case, the image processing control section 206D causes the image output section 30 to perform skip operation as in the second or third embodiment to inhibit the page corresponding to the pitch from being output at the pitch.

Thus, whether or not an underflow will occur is predicted before decompression processing is performed at each pitch and if it is predicted that an underflow will occur, output of the page corresponding to the pitch is skipped, thereby preventing an underflow from occurring in the code buffer 204 in decompression processing, so that output of an incomplete document can be eliminated.

By the way, if it is predicted that no underflow will occur by performing such underflow occurrence prediction processing, it is possible, for example, that some error occurs on the hard disk 205, temporarily stopping data transfer, resulting in an underflow. The OF/UF detection section 208 detects such an underflow and sends an interrupt signal to the image processing control section 206D as an underflow occurrence notification. Then, purge processing is performed and the page is again output in the image output section 30 as in the first embodiment.

In the fourth embodiment, underflow occurrence prediction processing for the code buffer 204 is performed when each pitch is started. However, it may be performed for all pages in batch at the completion of image data input.

As we have discussed, according to the invention, an image processing apparatus can be provided which inputs and outputs images at a constant pitch, and can secure high image quality after decompression without setting any target code amount while shortening the time required for processing from image input to image output.

What is claimed is:

1. An image processing apparatus comprising:
   input means for causing input of image data;
   means for compressing the input image data into coded data;
   a main storage section for storing the coded data;
   means for buffering a transfer of the coded data from the compressing means to the main storage section;
   means for detecting an overflow in the buffering means; and
   control means for instructing, when the detecting means has detected an overflow, the buffer means to discard coded data of an image which caused the overflow, and continue transferring residual coded data of a preceding image to the main storage section, and for controlling the input means to cause re-input of image data of the image that caused the overflow.

2. The image processing apparatus as claimed in claim 1, wherein when the detecting means has detected the overflow, the compressing means compresses the re-input image data at the same compression ratio as applied to the image data that caused the overflow.

3. An image processing apparatus comprising:
   a main storage section for storing coded data as compressed image data;
   means for decompressing the stored coded data into image data;
   output means for producing output images of the decompressed image data on a page-by-page basis at a constant time interval;
   means for buffering a transfer of the coded data from the main storage section to the decompressing means;
   means for detecting an underflow in the buffering means; and
   control means for instructing, when the detecting means has detected an underflow, the main storage section to continue transferring coded data that caused the underflow to the buffering means, and for causing the output means to again produce an output image of the coded data that caused the underflow.

4. The image processing apparatus as claimed in claim 3, wherein the output means forms an output image on a sheet, and comprises:

first receiving means for receiving a sheet that is output from the output means when the detecting means has not detected an underflow; and second receiving means for receiving a sheet that is output from the output means when the detecting means has detected an underflow.

5. An image processing apparatus comprising:

input means for causing input of image data;

means for compressing the input image data into coded data;

a main storage section for storing the coded data;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

first detecting means for detecting an overflow in the buffering means;

second detecting means for detecting an underflow in the buffering means; and control means for instructing, when the detecting means has detected an overflow, the buffer means to discard coded data of an image which caused the overflow, and continue transferring residual coded data of a preceding image to the main storage section, and controlling the input means to cause re-input of image data of the image that caused the overflow; and for instructing, when the detecting means has detected an underflow, the main storage section to continue transferring coded data that caused the underflow to the buffering means, and causing the output means to again produce an output image of the coded data that caused the underflow.

6. An image processing apparatus comprising:

input means for causing input of image data;

means for compressing the input image data into coded data;

a main storage section for storing the coded data;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

detecting means for detecting an overflow in the buffering means during the image data input operation;

means for storing overflow information indicating on a page-by-page basis whether the detecting means has detected an overflow; and control means for judging, during the image data output operation, whether coded data of a particular page corresponds to image data that caused an overflow in the image data input operation based on the overflow information, and for instructing, if the former corresponds to the latter, the main storage section to continue transferring the coded data of the particular page to the buffering means, and causing the output means to produce an output image of the coded data of the particular page with a delay of one page.

7. An image processing apparatus comprising:

input means for causing input of image data;

means for compressing the input image data into coded data;

a main storage section for storing the coded data;

means for storing amount information indicating amounts of the coded data on a page-by-page basis;

means for decompressing the stored coded data into image data;

output means for producing output images of the decompressed image data on a page-by-page basis at a constant time interval;

means for buffering a transfer of the coded data from the compressing means to the main storage section during an image data input operation and a transfer of the coded data from the main storage section to the decompressing means during an image data output operation;

means for predicting based on amount information of the coded data of the particular page whether coded data of a particular page will cause an underflow in the buffering means in the image data output operation; and control means for instructing, if the predicting means has predicted that the coded data of the particular page will cause an underflow, the main storage section to continue transferring the coded data of the particular page to the buffer means, and for causing the output means to produce an output image of the coded data of the particular page with a delay of one page.

8. The image processing apparatus as claimed in claim 7, wherein the predicting means predicts further based on amount information of coded data of at least one page that precedes the particular page.

* * * * *